United States Patent [19]

Matson et al.

[11] Patent Number: 5,652,192
[45] Date of Patent: Jul. 29, 1997

[54] CATALYST MATERIAL AND METHOD OF MAKING

[75] Inventors: Dean W. Matson, Kennewick; John L. Fulton, Richland; John C. Linehan, Richland; Roger M. Bean, Richland; Thomas D. Brewer, Richland; Todd A. Werpy, Richland; John G. Darab, Richland, all of Wash.

[73] Assignee: Battelle Memorial Institute, Richland, Wash.

[21] Appl. No.: 412,480

[22] Filed: Mar. 28, 1995

Related U.S. Application Data

[63] Continuation-in-part of Ser. No. 393,954, Feb. 24, 1995, abandoned, which is a continuation-in-part of Ser. No. 205,914, Mar. 3, 1994, abandoned, Continuation-in-part of Ser. No. 911,842, Jul. 10, 1992, abandoned.

[51] Int. Cl.$^6$ ............... B01J 23/10; B01J 23/44; B01J 27/053; C22B 5/20
[52] U.S. Cl. ............... 502/304; 75/362; 117/35; 117/36; 502/217; 502/338; 502/339; 505/733
[58] Field of Search ............... 252/313.1, 313.2, 252/314, 315.01, 315.6, 315.7; 501/12; 422/151, 202, 203; 75/362; 117/35, 36; 502/217, 218, 222, 213, 304, 338, 339; 505/733

[56] References Cited

U.S. PATENT DOCUMENTS

| | | | |
|---|---|---|---|
| 2,147,533 | 2/1939 | Katzoff et al. | 252/313.1 X |
| 3,132,110 | 5/1964 | Hansford | 502/217 |
| 3,297,411 | 1/1967 | Dear | 422/202 X |
| 3,342,587 | 9/1967 | Goodrich et al. | 75/362 X |
| 3,401,125 | 9/1968 | Jaffe | 502/219 |
| 3,767,590 | 10/1973 | Kenney | 252/313.1 |
| 4,209,330 | 6/1980 | Bloom et al. | 252/314 X |
| 4,701,218 | 10/1987 | Barker et al. | 252/313.1 X |
| 4,734,451 | 3/1988 | Smith | 264/12 X |
| 4,845,056 | 7/1989 | Yamanis | 501/12 |
| 5,037,579 | 8/1991 | Matchett | 252/313.1 |
| 5,066,420 | 11/1991 | Chevallier | 252/313.2 |

FOREIGN PATENT DOCUMENTS

| | | | |
|---|---|---|---|
| 233646 | 12/1968 | U.S.S.R. | 75/362 |

*Primary Examiner*—Richard D. Lovering
*Attorney, Agent, or Firm*—Paul W. Zimmerman

[57] ABSTRACT

The material of the present invention is a mixture of catalytically active material and carrier materials, which may be catalytically active themselves. Hence, the material of the present invention provides a catalyst particle that has catalytically active material throughout its bulk volume as well as on its surface. The presence of the catalytically active material throughout the bulk volume is achieved by chemical combination of catalytically active materials with carrier materials prior to or simultaneously with crystallite formation.

35 Claims, 4 Drawing Sheets

CATALYST MATERIAL AND METHOD OF MAKING

This application is a continuation-in-part of application Ser. No. 08/393,954, filed Feb. 24, 1995 now abandoned, which is a continuation-in-part of application Ser. No. 08/205,914 filed Mar. 3, 1994 now abandoned, which is a continuatin-in-part of application Ser. No. 07/911,842, filed Jul. 10, 1992 now abandoned.

This invention was made with Government support under Contract DE-AC06 76RLO 1830 awarded by the U.S. Department of Energy. The Government has certain rights in the invention.

FIELD OF THE INVENTION

The present invention relates generally to a method and apparatus for making nanometer-sized particles. More specifically, the method is making a solution of a soluble precursor in a liquid solvent, then continuously flowing the solution through a heated vessel and forming particles within the heated vessel, quenching the solution in a cooled region, then recovering the particles.

The present invention also relates generally to a multi-component catalyst material having catalytically active material substantially interspersed throughout a bulk volume of a carrier material. One component of the catalyst material may be a promoter.

BACKGROUND OF THE INVENTION

Particles ranging in size from 1 nm (nanometer, $10^{-9}$ meter) to more than 100 nm exhibit unique and useful surface and interface properties because they contain a high proportion of surface-to-bulk atoms. Uses of these particles include but are not limited to heterogenous catalysts, ceramic materials fabrication, intermetallics, electronics semiconductor fabrication, magnetic recording media, and superconductors.

Production of nanometer-sized particles is currently accomplished in a variety of ways, including gas phase condensation; laser synthesis processes; freeze drying methods; flame or plasma torch reactions; vacuum synthesis methods utilizing sputtering, laser ablation, liquid metal ion sources; reverse micelle solutions; solidification from the liquid state; and hydrothermal methods.

It is a long-felt need in the art of nanometer-sized particle production to be able to produce larger quantities at faster rates and to be able to control product particle size distribution in order to improve performance and cost of products, including but not limited to those enumerated above.

Because a preferred embodiment of the present invention is a hydrothermal method, hydrothermal methods are further summarized herein. Hydrothermal methods utilize aqueous solutions at conditions of elevated temperatures and/or elevated pressures wherein particles are formed by nucleation and grown under these conditions to produce powder products.

Conventional hydrothermal methods begin with making a solution of a soluble precursor in a water based solvent, or aqueous slurry of insoluble or partially soluble solids. The batch is placed in a vessel. Particles are formed by chemical reactions resulting in nucleation forming precipitates within the vessel. Reactions may be enhanced by heating, or pressurization, or both. Heating includes a "ramped" heating stage to bring the solution to a desired temperature.

Hydrothermal methods have been carried out in batch, semi-batch, and continuous processes. Whether batch, semi-batch, or continuous process, these methods are characterized by reactor residence times from about 10 min. to well over several hours, and even days, to achieve 90 percent conversion of starting material to precipitated product.

Hydrothermal reactions are carried out at elevated temperature and pressure, generally for the purpose of obtaining specific crystalline structure useful as a catalyst, pigment, or other purpose. Often materials known as mineralizers are added to modify the solid solubilities in the solution, thereby modifying rate of particle growth for the purpose of controlling the specific crystalline structure.

Particle sizes obtained using hydrothermal processing methods are a result of concentrations of reactants, concentrations and type of mineralizers, the amount of time that the reactants are in contact with the hydrothermal solution, and the temperature and pressure of the reactant solution. Using current methods, it is difficult to control the reactants' contact time at given conditions of temperature and pressure because of large total heat capacity of vessels and solutions.

Hydrothermally formed particles include but are not limited to oxides and hydroxides formed by hydrolysis or oxidation reactions in aqueous solvent systems. More specifically, particle products include but are not limited to iron oxide, titanium oxide, nickel oxide, zirconium oxide, aluminum oxide, and silicon oxide. Precursor solutions from which particles are made include but are not limited to aqueous nitrate solutions, sulfate solutions, and oxalate solutions. For example, iron oxide particles may be made from $Fe(NO_3)_3$ or $Fe(NH_4)(SO_4)_2$.

Other materials can be formed by reactions in non-aqueous solvent systems; for example, organometallic species as well as non-oxide ceramic particles, formed by reaction of a precursor with a solvent.

Further operational details of hydrothermal methods may be found in *Hydrothermal Synthesis of Advanced Ceramic Powders*, William J. Dawson, Ceram. Bull., 67, 1988, pp. 1673–1677, and in *The Role of Hydrothermal Synthesis in Preparative Chemistry*, Albert Rabenau, Agnew. Chem. Int. Ed. Engl., 24, 1985, pp. 1026–1040.

Another example of preparing fine powders is found in U.S. Pat. No. 4,734,451, issued on Mar. 29, 1988, to R. D. Smith, entitled SUPERCRITICAL FLUID MOLECULAR SPRAY THIN FILMS AND FINE POWDERS. Smith teaches the formation of fine powders by dissolving a solid material into a supercritical fluid solution and rapidly expanding the solution through a short orifice into a region of low pressure, thereby nucleating and forming particles in the region of low pressure. This process differs from the ones described above inasmuch as it is a continuous process and there is no chemical reaction between the solid material and the supercritical fluid solution. While the Smith process is useful for soluble polymers, organic compounds, and many inorganic compounds, it is not useful for insoluble or substantially insoluble ceramic materials, metal oxides, and other above-mentioned substantially insoluble materials. In addition to requiring dissolution of the particle forming compound, the Smith process requires operations at conditions under which carrier solutions have no liquid droplet formation upon expansion to low pressure, whereas the present invention does not require this limitation.

Presently, sulfated metal oxide catalysts are made by essentially dipping or otherwise imparting a coated layer of catalytically active material onto a carrier material (Materials Chemistry and Physics, 26 (1990) 213–237). Significantly, the sulfation step occurs after crystallite formation of the carrier material. The significance of the sulfation step occurring after the crystallite formation of the carrier material is that the sulfation is initially deposited primarily on a surface portion of the carrier material. The carrier material may be ceramic or metal oxide, and the catalytically active material is a sulfate in combination with the carrier material. Where the carrier material is a metal oxide, the metal oxide is selected from the group including but not limited to zirconium oxide, titanium oxide, hafnium oxide, iron oxide and tin oxide. Additionally, the catalytically active material may include a promoter of a metal including but not limited to nickel, copper, iron, and manganese, or any combination thereof. In use, carbon deposits form on the catalyst particle surfaces inhibiting the catalytic activity and ultimately requiring removal of the carbon in order to regenerate the catalyst active sites. However, because most of the catalytically active material is on the surface of the catalyst particles, removal of the carbon deposits also removes a portion of the active catalyst material, thereby limiting the number of times that removal of carbon deposits restores the catalyst particle to a useful level of catalytic activity.

SUMMARY OF THE INVENTION

The invention is an improvement to existing hydrothermal methods for producing particles or crystallites. It is preferred that the particles or crystallites exhibit small size and large surface area; for example, size as connoted by a diameter less than about 100 nm and a surface area greater than about 25 $m^2/g$. It is further preferred that particles or crystallites are produced having diameters less than about 20 nm and surface areas greater than about 100 $m^2/g$. More specifically, the invention uses a solution of precursor and solvent, in the absence of a material (mineralizer) that would substantially affect particle solubility and growth rate. The solution continuously flows through a heated vessel, specifically a tube, and chemically reacts to nucleate particle precipitates within the vessel, then flows into a cooled region for recovery of the particles. By using a tube so that elevated pressures and temperatures and solutions are attainable in continuous flow, the amount of time that the solution is at selected conditions of temperature and pressure are more precisely controllable and shorter, less than 15 min., and more preferably less than 1 min., and more frequently on the order of seconds, compared to pre-viously described hydrothermal processes. Flow of solution into the cooled region results in nearly instantaneous cooling of the solution and terminates particle growth.

Use of the continuous process of the present invention permits production of materials not producible with existing continuous processes. More specifically, the process of the present invention permits co-processing wherein catalytically active materials are mixed with carrier materials, which may be catalytically active themselves, in solution, thereby resulting in a catalyst particle that has catalytically active material throughout its bulk volume as well as on its surface. The presence of the catalytically active material throughout the bulk volume is achieved by chemical combination of catalytically active materials with carrier materials prior to or simultaneously with crystallite formation.

The process of the present invention permits production of particles and catalyst materials at a much faster rate compared to existing batch methods. Production rates of the present invention are from about tens of grams of particles per hour, to about several kilograms of particles per hour. In addition, particle size distributions are narrower compared to batch methods.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 4b is a 5000× of the alloy of FIG. 4a.

FIG. 5b is a 10,000× micrograph of an alloy made from the particles of FIG. 5a.

DESCRIPTION OF THE PREFERRED EMBODIMENT(S)

The invention is an improvement to hydrothermal and related methods wherein a solution of precursor and solvent continuously flow through a heated vessel and the solute chemically reacts to nucleate particle precipitates, then flows into a cooled region for recovery of the particles. The cooling also arrests particle growth.

Figure 1:
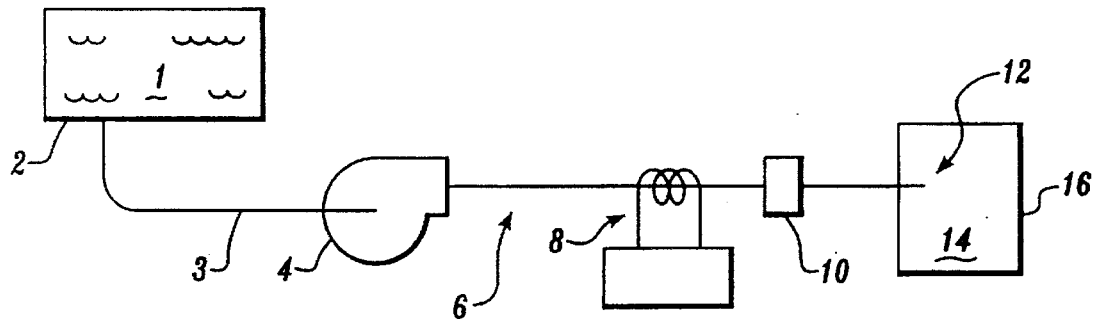
FIG. 1 is a schematic of an embodiment of the present invention.

An apparatus for carrying out the present invention is shown in FIG. 1. The solution (1) within the reservoir (2) flows into a first tube (3) and is pressurized by a pump (4). Pressurized solution flows into a reaction vessel (6) that may be any type of closed and pressurizeable continuous flow vessel having an inlet and outlet, but is preferably a tube. The reaction vessel (6) is heated by a heater (8). Pressure may be maintained within the reaction vessel (6) by any pressure control means, but preferably with a flow restrictor (10) located downstream of both the pump (4) and the heater (8). The heated solution is cooled by ejection from the end (12) of the reaction vessel (6), through the flow restrictor (10), and into a chamber (14) having walls (16) that are cooled. The heated solution is rapidly cooled within the chamber (14). Particles and reacted solution accumulate within the chamber (14). Particles are recovered by any method, including but not limited to spray drying, settling, filtering, or centrifugation. The particles may be dried by any drying means, including but not limited to flowing nitrogen, or air, or oven drying.

In a preferred embodiment, no particles are present in the precursor solution (1), and particles are formed only during application of heat to the solution. In a further embodiment, initial particles are present in the solution for providing nucleation sites for new particle formation during heating and for enlarging the initial particles during heating.

The reaction vessel (6) is preferably a tube capable of withstanding operating pressures up to about 8,000 psi (544 atm).

The heater (8) may be of any type, including but not limited to electrical resistance heaters, induction heaters, microwave heaters, fuel-fired heaters, and steam coils. One preferred heating embodiment uses the tube itself resistively heated with electricity, and another preferred heating embodiment is an oven surrounding the tube.

The flow restrictor (10) may be of any type, including but not limited to an adjustable valve, or a non-adjustable orifice such as a nozzle or lengths of small-diameter tubing.

The walls (16) may be cooled by any means, including but not limited to refrigeration coils, water/ice bath, liquid nitrogen, and dry ice.

In a preferred embodiment, a temperature sensor (not shown) is placed downstream of the heater (8) and in contact with the flowing solution for the purpose of monitoring and controlling the process temperature. The temperature sensor may be any temperature sensor, but is preferable a sheathed type K thermocouple.

Figure 2:
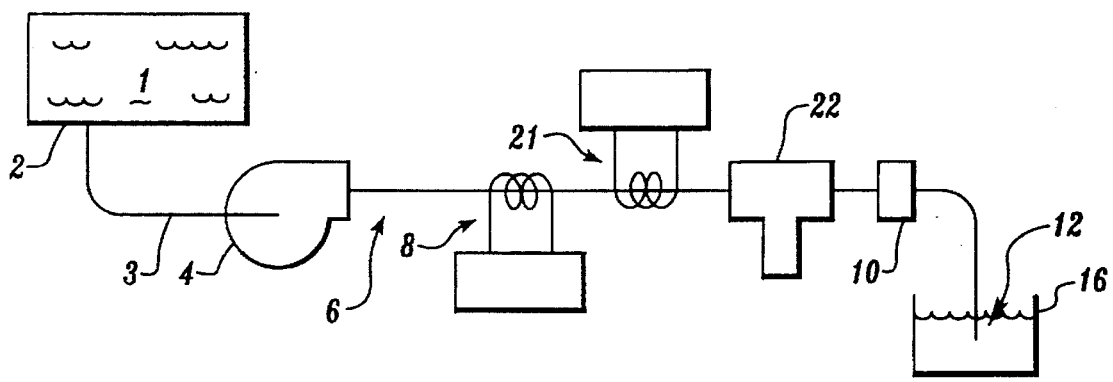
FIG. 2 is a schematic of a second embodiment of the present invention.

A second embodiment of an apparatus according to the present invention is shown in FIG. 2. Instead of an open chamber (14) for cooling and particle collection, a section of the reaction vessel (6) is cooled by a cooling means (21) downstream from the heater (8). Upon exiting the cooled section of reaction vessel (6), the solution (1) enters a filter means (22) wherein particles are collected while remaining liquid flows through the flow restrictor (10) to a catch basin (24).

The cooling means (21) may be any means, including but not limited to low temperature baths, including water and ice baths, and dry ice, as well as refrigeration cooling coils.

Although it is preferred to use a pump (4), it is not necessary since the solution (1) is pressurizeable by any means, including but not limited to mechanical pistons with weights on them, over-pressure of a gas, and hydraulic head.

The first two embodiments disclose a reservoir (2) holding a solution (1). Depending upon the desired product and the precursors and solvents necessary to obtain the product, the reaction vessel tube (3) may be provided with multiple ports for staged injection of precursors and solvents. The tube (3) itself may be a concentric tube having an inner and outer tube with an annular space therebetween.

Co-processing of precursors, solvents, or reagents can be accomplished according to the present invention by combining two or more precursors in solution. An example of co-processing is combining soluble metal salts with a sulfate containing salts in an aqueous stream to obtain sulfated metal oxide, a solid superacid catalyst.

A sulfated metal oxide solid superacid catalyst material is made in accordance with the present invention by making a first precursor of aqueous soluble metal containing compound. Examples of metals include but are not limited to zirconium, titanium, hafnium, iron and tin. Examples of zirconium compounds include but are not limited to zirconium citrate ammonium complex, zirconyl nitrate, and zirconium sulfate. The second precursor containing sulfate may be selected from the group including but not limited to ammonium sulfate, sodium sulfate, sulfuric acid, sodium hydrogen sulfate, ammonium hydrogen sulfate, potassium hydrogen sulfate, zirconiumsulfate, lithium sulfate, lithium hydrogen sulfate, and any combination thereof. Reaction temperatures for making sulfated metal oxides range from about 100° C. about 400° C. with temperatures from about 300° C. to about 400° C. preferred.

The first precursor containing metal is dissolved in water. The concentration of the first precursor can be as high as about 1M. No lower concentration is recited since product may be obtained at any non-zero concentration. Above about 1M, deposits begin to form on the wall of the reactor tube inhibiting reactor operation. Preferred concentration of the first precursor is from about 0.1M to about 0.25M. The second precursor containing sulfate is added to the first precursor prior to heating. The amount of sulfate depends uponthe type of sulfate compound used. In early trials using sulfuric acid, a concentration of 42 cc/l resulted in degradation of pump seals, so lower concentrations were used to avoid pump seal degradation. Nevertheless, there does not appear to be any non-zero concentration of sulfuric acid that would not result in a product catalyst material. Preferred concentration of sulfuric acid is below about 1M. When ammonium sulfate is used, concentrations as high as 3–4M produce the desired product. Again, there appears to be no non-zero concentration of ammonium sulfate that would not provide a catalyst material product. Preferred concentration of ammonium sulfate is below about 4M.

Additional precursors including but not limited to nickel, copper, iron, and manganese, either alone or in combination, may be co-processed with the first precursor metal to provide a promoter, dopant, stabilizer, or other functional compound that together with a primary catalyst material provide a desired activity. For example, manganese sulfate, nickel sulfate, ferrous sulfate, ferric sulfate, ferrous ammonium sulfate, ferric ammonium sulfate, and copper sulfate are exemplary of compounds that are combineable for co-processing. The promoter need not be added as a sulfate salt but may include nitrates and halides.

Catalysts made with co-processing have the feature that the catalytically active material and the carrier material are mixed together in solution so that chemical combining occurs prior to or simultaneous with crystallite formation resulting in a substantially homogeneous solid material. In the above example, the chemical combining is sulfation that occurs prior to or simultaneous with crystallite formation. Therefore, as catalyst particles are worn and surface material removed either through operational wear or regeneration fresh active catalyst material is exposed and useful catalytic activity is maintained for a substantially longer period of time compared to conventional catalyst materials. Also, the concentration of active sites at the surface is substantially constant as the catalyst material is worn or regenerated. It is estimated that the lifetime of the catalyst material made by the co-processing of the present invention would be increased by at least a factor of 10% over conventional sulfated metal oxide catalysts and very likely by a factor of 2 or greater.

Precursors having different reaction temperatures may be reacted with a multi-port or concentric tube reaction vessel. It is preferred that co-processing avoids precipitation of solid species from reactions between precursors of one of the precursors in advance of heating. The heated region of the reaction vessel tube may be controlled to exhibit a temperature variation along its length, wherein various compounds may be added into an appropriate temperature zone.

In operation, particle size is determined by many factors, including temperature, pressure, type of flow restrictor, and concentration and type of precursor in the solution. Flow rate of solution to achieve a particle production rate depends upon the same factors recited above and may vary over a wide range. For operational convenience, flow rates and tube lengths are selected to provide a residence time of solution (1) within the vessel (6) of less than 5 min., and more preferably less than 2 min., and most preferably between from about 1 sec. to 30 sec. to achieve conversion of the precursor. It is preferred that conversion is between from about 80% to about 95% or above in a single pass. The temperature and pressure of the solution within the vessel may also vary widely depending upon the type of solution and the size of particles desired. Temperatures may range from about 25° C. (ambient) to greater than 500° C. but are preferably from about 100° C. to about 400° C. Pressures are sufficient to prevent substantial vaporization of the solution within the reaction vessel, thereby maintaining the solution substantially in the liquid phase. The terms "substantial" and "substantially" are used because it is recognized that vaporization may not be completely avoided. Furthermore, some vaporization of solution is not harmful to the process of the present invention. Within the preferred temperature range, pressures are preferably from about 2,000 psi (136 atm) to about 8,000 psi (544 atm).

The process of the present invention is not limited to the type of chemical reaction occurring within the reaction vessel. It is preferred, however, that the reaction take place within the reaction vessel and not within the inlet reservoir or the outlet. The chemical reaction may be an interaction of the precursor with the solvent at elevated temperature conditions; for example, oxide formation. The chemical reaction may be a thermal breakdown of the precursor into an insoluble form; for example, formation of iron particles from an iron pentacarbonyl/carbon dioxide solution. The chemical reaction may be thermal decomposition of an additional reactant, for example addition of urea decomposing into ammonia in a solution of iron nitrate and forming iron hydroxide particles.

The apparatus and method or process of the present invention can accommodate any combination of precursor and solvent provided that the precursor-is soluble in the solvent. Solvents may be selected from inorganic and organic liquids. Inorganic liquids include but are not limited to water (aqueous solvent) and ammonia. Organic liquids that may be used as solvents in the present invention include but are not limited to carbon dioxide, hydrocarbons, halogenated hydrocarbons, and alcohols. Precursors that are aqueous soluble include but are not limited to ferric or ferrous salts; for example, ferric halide, ferric sulfate, ferric (periodic chart column 1A element) sulfate, and citrates of zirconium and titanium. Precursors may also be made from a three-part combination of an oxalate with a second part that is a group 1A element or ammonium, and a third part that is a 4b element or 4b element containing oxygen. Other precursors include metal halides, sulfates, for example nickel sulfate and cobalt sulfate and nitrates for example zirconyl nitrate. An example of a metal halide precursor is aluminum trichloride without any precipitating agent or an amount of precipitating agent that is ineffective to produce a precipitate prior to heating.

Precursors that are soluble in carbon dioxide, especially supercritical carbon dioxide, include but are not limited to $Fe(CO)_5$ and $Mo(CO)_6$.

A characteristic of these mixtures or solutions is that there is no substantial precipitation or particle formation as a result of making the mixture or solution. Particles are formed upon heating under pressure. Initial particles may be added to the solution prior to heating, but initial particles are not a result of making a solution or mixture.

An additional solute may be oxidizing like hydrogen peroxide or urea or reducing like hydrazine, hydrogen gas or sodium borohydride and added for the purpose of controlling the chemical environment that the particles grow in. The output of the process is a slurry or suspension of powder particles. The slurry or suspension may be used directly as a feed stream into a process, or the particles recovered, for example by centrifugation, and further used as a powder.

EXAMPLE 1

An experiment was performed to produce particles according to the method of the present invention using an apparatus according to FIG. 1. An aqueous solution of iron nitrate (0.1M $Fe(NO_3)_3$) was pressurized with a reciprocating pump (4) to a pressure of about 510 Bar (7500 psi) and transported through a reaction vessel (6). The reaction vessel (6) was 316 stainless steel tubing having an outside diameter of 0.32 cm, a wall thickness of 0.09 cm, and a length of 90 cm. The reaction vessel (6) was heated by resistive electrical heating. The solution had a flow rate of about 50 cc/min. The tube temperature was held constant for each run, and several runs were made having aqueous solution temperatures ranging from about 225° C. to about 400° C., as measured downstream of the heated region.

The flow restrictor (10) was constructed of a short length (length less than about 2.5 cm) of capillary tubing having an inside diameter from about 60 micrometers to about 100 micrometers.

The heated solution was ejected into a flask immersed in a water/ice bath.

Phase identification and size of the particles was performed using powder X-ray particle diffraction. Diffraction patterns were obtained using a Philips X-ray diffractometer with a copper source operated at 40 kV and 25 mA. Particle size estimates were made by line broadening analysis of the diffraction pattern based upon the Scherrer formula as may be found in the book entitled ELEMENTS OF X-RAY DIFFRACTION, 2d edition, by BD Cullity, published by Addison Wesley, Reading, Mass., in 1978. A correction for instrument broadening was made to the Scherrer formula.

Confirmation of particle size, together with particle size distribution were obtained using transmission electron microscopy micrographs of particles deposited upon 3 mm carbon coated grids. The particles were micrographed in a Philips EM400T electron microscope operated at 120 keV. Particle size distributions were also obtained using variable temperature Mossbauer spectroscopy as described in the article entitled MOSSBAUER EFFECT STUDIES OF SURFACE IONS OF ULTRAFINE ALPHA-IRON(III) OXIDE PARTICLES, by A. M. Van der Kraan, published in Phys. Stat. Sol. A, Vol. 18, pp. 215–226 in 1973.

Surface area was obtained by a nitrogen absorption method using a Micrometrics ASAP 2000 instrument for further confirmation of the particle size measurements. Results are shown in Table 1.

For the identified sample numbers, processing parameters of temperature and pressure are shown. Results of yield, material phase, and particle size are also shown. Particle diameters are reported for three independent measurements along with confirmatory surface area measurements. From Table 1, one can see that particle sizes are larger for higher processing temperature. One also sees that the particle size range is narrow, showing size range variations of from 8 to 50 nm.

TABLE 1

Iron-Oxide Powders Produced From Fe(NO₃)₃

| | Processing Parameters | | | Crystallite Diameter (nm) | | | Surface Area |
|---|---|---|---|---|---|---|---|
| Sample # | Temperature (°C.) | Pressure (MPa) | Phase | XRD | TEM | Mossbauer | (m²/g) |
| 399-92-6 | 200 | 40–55 | Unknown | <<10 | — | 100% < 8.5 | 183 |
| 654-44-1 | 225 | 40–55 | Goethtite | <<10 | 2–10 | 100% < 8.5 | 212 |
| 654-43-1 | 225 | 48–55 | Goethtite | <<10 | 2–10 | 100% < 8.5 | 112 |
| 062-29-2 | 300 | 40–55 | Hematite | 11 | 10–20 | 56% > 8.5 | 167 |
| 654-45-1 | 300 | 40–55 | Hematite | 16 | — | — | 202 |
| 062-29-1 | 400 | 40–55 | Hematite | 23 | 20–70 | — | — |
| 654-45-2 | 400 | 40–55 | Hematite | 28 | — | 90% > 8.5 | — |

EXAMPLE 2

An experiment was performed to produce particles according to the method and using the apparatus set forth in Example 1. However, in this experiment, an aqueous solution of potassium bis(oxalato)oxotitanate (IV) (0.1M K₂TiO(C₂O₄)₂) was used. The solution had a flow rate of about 50 cc/min., and was heated in a reaction vessel tube (6) made of Hastelloy C-276.

Results are shown in Table 2. From Table 2, one can see that the particle size range. is narrow, showing range variations of 5 nm.

TABLE 2

Titanium-Oxide Powders Produced From K₂TiO(C₂O₄)₂

| Processing Parameters | | | Crystallite Diameter (nm) | | | Surface Area |
|---|---|---|---|---|---|---|
| Temperature (C.) | Pressure (MPa) | Phase | XRD | TEM | Mossbauer | (m²/g) |
| 200 | 40–55 | TiO₂ (Anatase) | 3.1 | — | — | — |
| 250 | 40–55 | TiO₂ (Anatase) | 4.2 | — | — | — |
| 300 | 40–55 | TiO₂ (Anatase) | 4.1 | 2–7 | — | 134 |

EXAMPLE 3

Another experiment was conducted according to the method and using the apparatus of Example 1. In this experiment, a solution of aluminum nitrate (0.1M) Al(NO₃)₃) was used. The solution was processed at a temperature of about 400° C. and produced very few particles.

Urea (CO(NH₂)₂) (1M) was added to the solution and particles were made at temperatures from between about 200° C. to about 300° C.

EXAMPLE 4

Other experiments were conducted according to the method and apparatus of Example 1 but using different combinations of solutions and precursors. The combinations and resulting particle or powder products are summarized in Table 3.

The results shown in Table 3 are demonstrative of the variety of particles that may be produced with the resent invention.

TABLE 3

Other Powders Produced

| Precursor | Solvent | Temp. (°C.) | Pressure (MPa) | Powder Material | Crystallite Diameter (nm) | | Surface Area (m²/g) |
|---|---|---|---|---|---|---|---|
| | | | | | XRD | TEM | |
| FeCO₅ | CO₂ | 350 | 17.2 | Alpha-Fe | 5.4 | — | — |
| Ni(NO₃)₂ | water | 450 | 55 | NiO₂ | 127 | — | — |
| Zirconium (IV) Citrate Ammonium Complex | water | 350 | 40–55 | ZrO₂ (Cubic) | 3.5 | — | — |
| Zirconium (IV) Citrate Ammonium Complex | water | 400 | 40–55 | ZrO₂ (Cubic) | 3.5 | — | 427 |

TABLE 4

Sulfated Metal Oxide Preparation

| Sample No. | Precursor | Concentration | Temperature (°C.) | Pressure (Kpsi) | Centrifuge/ Spray Dry |
|---|---|---|---|---|---|
| 54548-88-1 | Zr. cit. amm. complex/ $H_2SO_4$ | 0.1M/0.2M | 350–360 | 5–7 | Centrifuge |
| 54548-95-1 | ZrOCl2/H2SO4 | 0.1M/0.2M | 345–355 | 4.8–6.0 | Centrifuge |
| 54548-96-4 | ZrO(NO3)2/H2SO4 | 0.1M/0.2M | 345–355 | 4.4–6.0 | Centrifuge |
| 54548-96-3 | $ZrO(NO_3)_2$/H2SO4 | 0.1M/0.2M | 295–305 | 4.2–5.8 | Centrifuge |
| 54548-96-2 | $ZrO(NO_3)_2$/$H_2SO_4$ | 0.1M/0.2M | 245–255 | 4.0–5.8 | Centrifuge |
| 54548-97-3 | Zr. cit. amm. complex/ amm. sulfate | 0.1M/0.2M | 340–360 | 4.8–6.0 | Centrifuge |
| 54548-99-3 | $Zr(SO_x4)_2$ | 0.1M | 340–360 | 4.0–5.8 | Centrifuge |
| 54548-99-4 | $Zr(SO_4)_2$/Urea | 0.1M/0.25M | 340–360 | 4.4–5.8 | Centrifuge |
| 54548-102-3 | $Zr(SO_4)_2$/Urea | 0.1M/0.25M | 290–310 | 4.4–5.8 | Centrifuge |
| 54548-75-4 | Zr. cit. amm. complex/ amm. sulfate | 0.1M/0.2M | 290–310 | 4.4–5.8 | Spray |
| 54548-118-3 | $ZrO(NO_3)_2$/urea/amm. sulfate/ $Fe(NO_3)_3$/$MnSO_4$ | | 340–360° C. | | Centrifuge |

EXAMPLE 5

An experiment was conducted to demonstrate co-processing of precursors.

Preparation of Sulfated Zirconia Superacid Catalyst

Several aqueous soluble zirconium containing salts used as the first precursor were added to several sulfate sources used as the second precursor, as set forth in Table 4. A promoter was added as a precursor in one of the samples.

Zirconium containing salts were dissolved in water to a concentration of 0.1M and the sulfate sources were dissolved therein to a concentration of either 0.2M or 0.25M as set forth in Table 4, forming combined precursor solutions. The promoter was a combination of $Fe(NO_3)_3$ and $MnSO_4$ in one of the samples.

The combined precursor solutions were individually passed through the apparatus of the present invention at elevated temperatures. The temperatures and pressures varied during the processing. Table 4 reports the temperature and pressure variations during each processing. The pressure was set to maintain the precursor solution as a liquid. Pressure variation occurred as a result of using a reciprocating pump. However, pressure is not a critical parameter so long as substantial vaporization is avoided. The resulting suspension, containing sulfated zirconia precipitate, was centrifuged to separate the precipitate from the liquid. Then the precipitate was dried under vacuum at 100° C. or dried under flowing nitrogen at 20° C. room temperature. The dried precipitate was further activated at 500° C. in dry air for 1 hr.

The differences between samples are characterized primarily by (1) their precursor/temperature identification and (2) conversion of n-butane to isobutane.

Confirmation of Catalytic Activity of the Sulfated Zirconia

Superacidity of the precipitate was confirmed by n-butane isomerization. The n-butane isomerization involved contacting the precipitate with n-butane at a temperature of 200° C. in a continuous flow microreactor. Conversion was measured after 1 min. of isomerization time. An equivalent mass of 0.5 g of each sample shown in Table 4 was used.

Results of the isomerization are shown in Table 5. For zirconyl nitrate and sulfuric acid, the processing temperature must be in excess of 305° C. to achieve an isomerization conversion greater than 1.4%. For zirconium citrate ammonia complex and ammonium sulfate, competent isomerization conversion occurs with processing temperature less than 340° C.

TABLE 5

| | Conversion of N-Butane to Isobutane | | | | | | | | | |
|---|---|---|---|---|---|---|---|---|---|---|
| Sample No. 54548 | 88-1 | 95-1 | 96-4 | 96-3 | 96-2 | 97-3 | 99-3 | 99-4 | 75-4 | 102-3 | 118-3 |
| 1 Min Conversion | 35.7 | 50.3 | 23.6 | 1.4 | trace | trace | trace | 43.1 | 25.0 | 17.5 | 13 |

Zirconium sulfate processed at about 350° C. resulted in low isomerization conversion. This low conversion was not expected and is not fully understood. It is believed that urea aids in settling of precipitate but does not become part of the catalyst material. It is postulated that the low conversion of zirconium sulfate may have been a result of insufficient precipitate recovery. It is also postulated that a different process temperature may be needed. Other process temperatures were not tested.

EXAMPLE 6

An experiment was performed to compare the conversion of n-butane to isobutane using bulk sulfated metal oxide catalyst from Example 5 with commercially available surface sulfated metal oxide catalyst material. Commercial surface sulfated metal oxide catalyst material was obtained from Magnesium Elektron, Inc., Flemington, N.J., catalog number XZ)682. A mass equivalent to the mass of bulk sulfated metal oxide catalyst from Example 5 was used. The 1 min. conversion of n-butane to isobutane was 43.1 which closely matched sample no. 54548-102-3 in Table 4.

EXAMPLE 7

Further combinations of precursors, precursor concentration, processing temperatures, and processing pressures were performed. Results are presented in Tables 6 and 7. In most combinations, a product powder was produced. In a few, there was no product powder. In the few that produced no product powder, the most common reason was that the processing temperature was too low.

In Table 6, samples 52654-52-1 and 52654-52-2 produced a powder of yttria doped zirconia, a material that is useful for turbine blade coatings.

Figure 3:
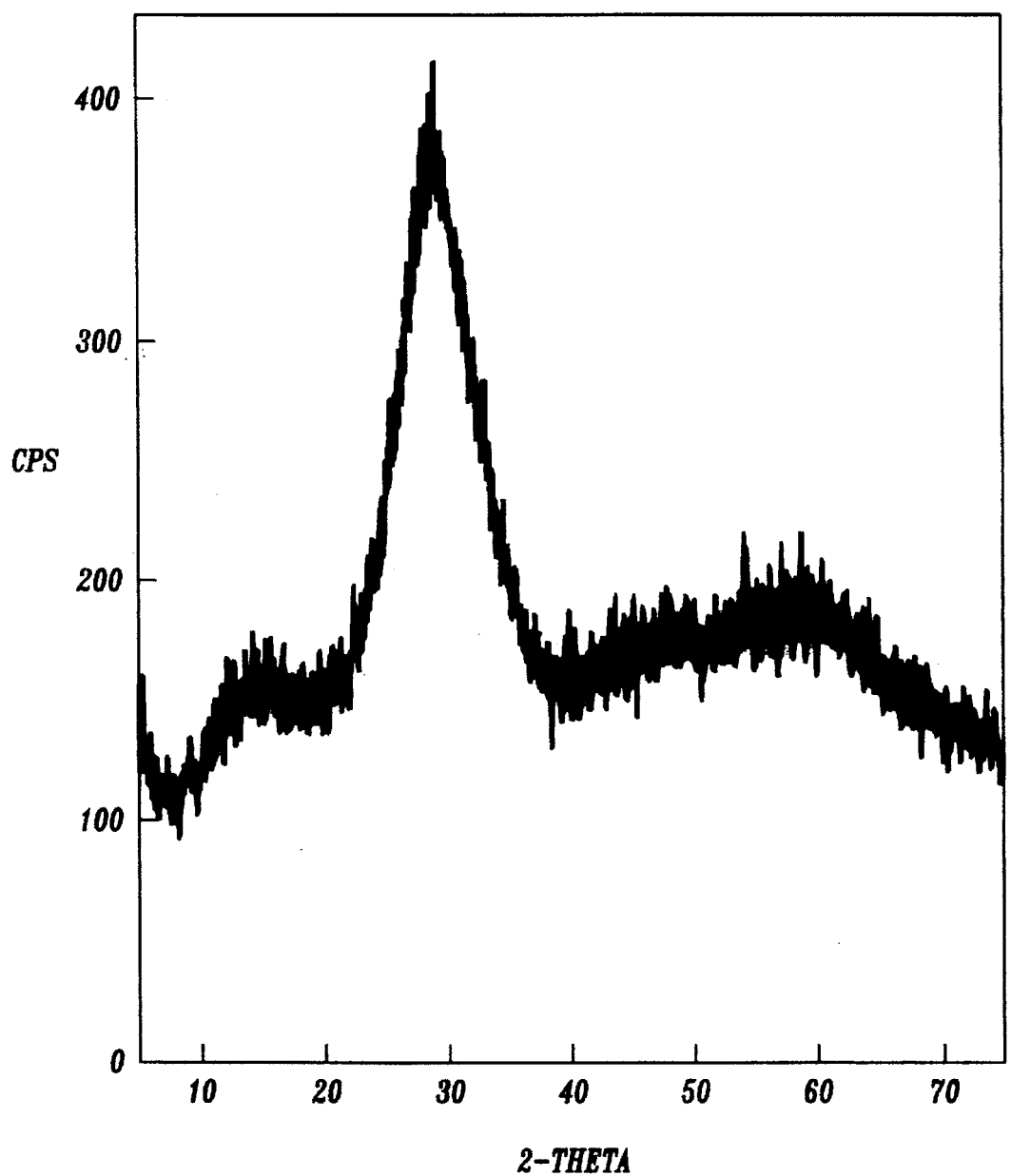
FIG. 3 is an XRD pattern of a new material made by the method of the present invention.

In Table 6, sample 52654-62-3 produced a suspension of ferric oxyhydroxide. The suspended ferric oxyhydroxide was precipitated by addition of concentrated phosphoric acid resulting in a pink solid. The solid was characterized with an XRD analysis which was unusual and unidentifiable because it did not match other known XRD patterns (See FIG. 3).

In Table 7, samples 54548-120-1 to 54548-121-1 and 54548-124-1 to 54548-125-5 resulted in cerium on zirconia which is a catalyst that is used for cold start catalytic converters in automobiles. XRD analyses confirmed the presence of both cerium and zirconia, either as cerium oxide and zirconia, or as a solid solution of cerium in

TABLE 6

Laboratory Data

|  | A<br>Sample Number | B<br>Precursor | C<br>Concentration | D<br>Temperature | E<br>Pressure | F<br>Amount | G<br>Powder | H<br>Prod wt |
|---|---|---|---|---|---|---|---|---|
| 1 |  |  |  |  |  |  |  |  |
| 2 |  |  |  |  |  |  |  |  |
| 3 | 12397-85-1 | Al(SO4)3 | 0.1M | 200 C. |  |  |  |  |
| 4 | 12397-85-2 | Al(SO4)3 | 0.1M | 300 C. |  | "little" | y |  |
| 5 |  |  |  |  |  |  |  |  |
| 6 | 12397-86-1 | K2TiO(C2O4)2 | 0.1M | cold | 6–7 Kpsi |  | n |  |
| 7 | 12397-86-2 | K2TiO(C2O4)2 | 0.1M | 150 C. | 6–7 Kpsi |  | y |  |
| 8 | 12397-86-3 | K2TiO(C2O4)2 | 0.1M | 200 C. | 6–7 Kpsi |  | y |  |
| 9 | 12397-86-4 | K2TiO(C2O4)2 | 0.1M | cold | 6–7 Kpsi |  | n |  |
| 10 | 12397-87-1 | K2TiO(C2O4)2 | 0.1M | 100 C. |  |  |  |  |
| 11 | 12397-87-2 | K2TiO(C2O4)2 | 0.1M | 150 C. |  |  |  |  |
| 12 | 12397-87-3 | K2TiO(C2O4)2 | 0.1M | 250–260 C. |  |  | y |  |
| 13 | 12397-87-4 | K2TiO(C2O4)2 | 0.1M | 300 C. |  |  | y |  |
| 14 | 12397-87-5 | K2TiO(C2O4)2 | 0.2M | 200 C. | 5000 psi |  | y |  |
| 15 | 12397-88-1 | K2TiO(C2O4)2 | 0.2M | cold |  |  | n |  |
| 16 | 12397-88-2 | K2TiO(C2O4)2 | 0.2M | 250 C. |  |  | y |  |
| 17 | 12397-88-3 | K2TiO(C2O4)2 | 0.2M | 200 C. |  |  | y |  |
| 18 |  |  |  |  |  |  |  |  |
| 19 | 12397-88-4 | K3Fe(C2O4)3 | 0.1M | 200 C. | 6–7 Kpsi |  | y |  |
| 20 | 12397-88-5 | K3Fe(C2O4)3 | 0.1M | 250 C. | 6–7 Kpsi |  | y |  |
| 21 |  |  |  |  |  |  |  |  |
| 22 | 12397-90-1 | Fe(NH4)(SO4)2 | 0.1M | 250–260 C. | 6–7 Kpsi | 500 cc |  |  |
| 23 | 12397-90-2 | Fe(NH4)(SO4)2 | 0.1M | 250 C. | 4–7 Kpsi | 1 liter |  |  |
| 24 | 12397-90-3 | Fe(NH4)(SO4)2 | 0.1M | 200 C. |  |  |  |  |
| 25 | 12397-91-1 | Fe(NH4)(SO4)2 | 0.1M | 235 C. | 6.5–8 Kpsi | 300 cc | y |  |
| 26 | 12397-91-2 | Fe(NH4)(SO4)2 | 0.1M | 235 C. | 6–8 Kpsi | 600 cc | y |  |
| 27 |  |  |  |  |  |  |  |  |
| 28 | 12397-92-1 | Zr citrate amm. comp | 0.1M | 200 C. | 6–8 Kpsi |  | n |  |
| 29 | 12397-92-2 | Zr citrate amm. comp | 0.1M | 250 C. |  |  | n |  |
| 30 | 12397-92-3 | Zr citrate amm. comp | 0.1M | 300 C. |  |  | n |  |
| 31 | 12397-92-4 | Zr citrate amm. comp | 0.1M | 350 C. |  |  | y |  |
| 32 | 12397-92-5 | Zr citrate amm. comp | 0.1M | 400 C. |  |  | y |  |
| 33 |  |  |  |  |  |  |  |  |
| 34 | 12397-92-6 | Fe(NO3)3 buffered | 0.1M | 225 C. | 6–8 Kpsi | 1.75 l | y |  |
| 35 |  |  |  |  |  |  |  |  |
| 36 | 54548-10-1 | K2TiO(C2O4)2 | 0.1M | 300 C. | 7–8 Kpsi |  | y |  |
| 37 | 54548-10-2 | K2TiO(C2O4)2 | 0.1M | 250 C. | 7–8 Kpsi |  | y |  |
| 38 | 54548-10-3 | K2TiO(C2O4)2 | 0.1M | 200 C. | 6–8 Kpsi |  | y |  |
| 39 | 54548-10-4 | K2TiO(C2O4)2 | 0.1M | 150 C. |  |  | y |  |
| 40 | 54548-12-1 | K2TiO(C2O4)2 | 0.1M | 200 C. | 6–8 Kpsi |  | y |  |
| 41 | 54548-12-2 | K2TiO(C2O4)2 | 0.1M | 160 C. | 6–8 Kpsi |  | y |  |
| 42 |  |  |  |  |  |  |  |  |
| 43 | 54548-13-1 | Zr citrate amm. comp | 0.1M | 350–360 C. | 7–8 Kpsi | 700 cc | y |  |
| 44 |  |  |  |  |  |  |  |  |
| 45 | 54548-13-2 | AlNH4(SO4)2 | 0.1M | 200 C. | 7–8 Kpsi |  |  |  |
| 46 | 54548-13-3 | AlNH4(SO4)2 | 0.1M | 250 C. | 7–8 Kpsi |  | y |  |
| 47 | 54548-14-1 | AlNH4(SO4)2 | 0.1M | 150 C. | 7–8 Kpsi |  | n |  |
| 48 |  |  |  |  |  |  |  |  |
| 49 | 54548-15-1 | Al(NO3)3 | 0.1M | 200 C. | 6500–8 Kpsi |  | n |  |
| 50 | 54548-15-2 | Al(NO3)3 | 0.1M | 300 C. | 7–8 Kpsi |  | y |  |
| 51 | 54548-15-3 | Al(NO3)3 | 0.1M | 250 C. | 6600–8 Kpsi | 350 cc | n |  |
| 52 |  |  |  |  |  |  |  |  |
| 53 | 54548-16-1 | Al(NO3)3 + urea | 0.1M/1.0M | 200 C. | 6800–8 Kpsi |  | n |  |
| 54 | 54548-16-2 | Al(NO3)3 + urea | 0.1M/1.0M | 250 C. | 6800–8 Kpsi |  | y |  |
| 55 | 54548-16-3 | Al(NO3)3 + urea | 0.1M/1.0M | 300 C. | 6800–8 Kpsi |  | y |  |
| 56 | 54548-16-4 | Al(NO3)3 + urea | 0.1M/1.0M | 350 C. | 6800–8 Kpsi |  | y |  |
| 57 |  |  |  |  |  |  |  |  |
| 58 | 54548-16-5 | Zr citrate amm. comp | 0.1M | 340–345 C. | 7–8 Kpsi |  | y |  |
| 59 | 54548-16-6a | Zr citrate amm. comp | 0.1M | 360–370 C. | 7–8 Kpsi |  | y |  |

TABLE 6-continued

Laboratory Data

| | A<br>Sample Number | B<br>Precursor | C<br>Concentration | D<br>Temperature | E<br>Pressure | F<br>Amount | G<br>Powder | H<br>Prod wt |
|---|---|---|---|---|---|---|---|---|
| 60 | 54548-16-6b | Zr citrate amm. comp | 0.1M | 360–380 C. | 7–8 Kpsi | | y | |
| 61 | | | | | | | | |
| 62 | 54548-19-1 | Fe(NO3)3 + urea | 0.1M/0.1M | 150 C. | 6–8 Kpsi | | n | |
| 63 | 54548-19-2 | Fe(NO3)3 + urea | 0.1M/0.1M | 200 C. | 6–8 Kpsi | | n | |
| 64 | 54548-19-3 | Fe(NO3)3 + urea | 0.1M/0.1M | 250 C. | 6–8 Kpsi | | y | |
| 65 | 54548-19-4 | Fe(NO3)3 + urea | 0.1M/0.1M | 300 C. | 6–8 Kpsi | | y | |
| 66 | 54548-19-5 | Fe(NO3)3 + urea | 0.1M/0.1M | 350 C. | 6–8 Kpsi | | y | |
| 67 | | | | | | | | |
| 68 | 54548-19-6 | Fe(NO3)3 + urea | 0.1M/1.0M | 200 C. | 6–8 Kpsi | | n | |
| 69 | 54548-19-7 | Fe(NO3)3 + urea | 0.1M/1.0M | 250 C. | 6–8 Kpsi | | y | |
| 70 | 54548-20-1 | Fe(NO3)3 + urea | 0.1M/1.0M | 300 C. | 6400–8 Kpsi | | y | |
| 71 | | | | | | | | |
| 72 | 54548-25-1 | Zr complex/Na2HPO3 | 0.1M/0.1M | 350 C. | 6–8 Kpsi | minor | y | |
| 73 | 54548-28-1 | Zr complex/Na2HPO3 | 0.1M/0.1M | 250–400 C. | 6–8 Kpsi | | y | |
| 74 | | | | | | | | |
| 75 | 54548-36-1 | Fe(NO3)3/Ba(NO3)2 | 0.1M/.0.5M | 280–310 C. | 6–8 Kpsi | | y | |
| 76 | | | | | | | | |
| 77 | 54548-36-2 | (NH4)TiO(C2O4)2 | 0.1M | 150 C. | 6–8 Kpsi | 125 cc | n | |
| 78 | 54548-36-3 | (NH4)TiO(C2O4)2 | 0.1M | 200 C. | 6–8 Kpsi | 125 cc | n | |
| 79 | 54548-36-4 | (NH4)TiO(C2O4)2 | 0.1M | 250 C. | 6–8 Kpsi | 125 cc | y | |
| 80 | 54548-36-5 | (NH4)TiO(C2O4)2 | 0.1M | 300 C. | 6–8 Kpsi | 125 cc | y | |
| 81 | | | | | | | | |
| 82 | 54548-37-1 | K2TiO(C2O4)2/urea | 0.1M/0.5M | 250 C. | 6–8 Kpsi | | y | |
| 83 | 54548-37-2 | K2TiO(C2O4)2/urea | 0.1M/0.5M | 300 C. | 6–8 Kpsi | | y | |
| 84 | | | | | | | | |
| 85 | 54548-37-3 | K2TiO(C2O4)2 | 0.1M | 250–260 C. | 6–8 Kpsi | 1.5 l | y | |
| 86 | 54548-37-4 | K2TiO(C2O4)2 | 0.1M | 250–260 C. | | | y | |
| 87 | | | | | | | | |
| 88 | 54548-47-1 | ZrO(NO3)2 | 0.1M | 400 C. | 6–8 Kpsi | small | y | |
| 89 | | | | | | | | |
| 90 | 54548-47-2 | K2TiO(C2O4)2/Cr(NO3)3 | 31.9/4.0 g/l | 250–260 C. | 4000–7500 | 500 cc | y | |
| 91 | | | | | | | | |
| 92 | 54548-48-1 | K2TiO(C2O4)2/Fe(NO3)3 | 31.9/4.0 g/l | 250–260 C. | 3500–7500 | 250 cc | y | |
| 93 | | | | | | | | |
| 94 | 54548-48-2 | TiCl3/SnCl2 | .07M/.03M | 250–260 C. | 6–8 Kpsi | 250 cc | y | |
| 95 | | | | | | | | |
| 96 | 54548-49-1 | Fe(NO3)3/Ni(NO3)2 | .067M/.033M | 350–360 C. | 6500–7500 | | y | |
| 97 | 54548-49-2 | Fe(NO3)3/Ni(NO3)2/urea | .067/.033/0.5M | 350–370 C. | 6500–7500 | | y | |
| 98 | 54548-49-3 | Fe(NO3)3/Ni(NO3)2/urea | .067/.033/0.5M | 400 C. | 6500–7500 | | y | |
| 99 | | | | | | | | |
| 100 | 54548-50-1 | Fe(NO3)3/Cu(NO3)2 | .067M/.033M | 350–360 C. | 6500–7500 | | y | |
| 101 | 54548-50-2 | Fe(NO3)3/Cu(NO3)2/urea | .067/.033/0.5M | 350–360 C. | 6500–7500 | | y | |
| 102 | 54548-50-3 | Fe(NO3)3/Cu(NO3)2/urea | .067/.033/0.5M | 400 C. | 6500–7500 | | y | |
| 103 | | | | | | | | |
| 104 | 54548-50-4 | Ni(NO3)2 + urea | 0.1M/0.5M | 350–370 C. | 6500–7500 | 500 cc | y | |
| 105 | | | | | | | | |
| 106 | 54548-51-1 | Zn(NO3)2 + urea | 0.1M/.5M | 350–370 C. | 6000–7500 | 250 cc | y | |
| 107 | | | | | | | | |
| 108 | 54548-51-2 | Zn(NO3)2 | 0.1M | 150 C. | | | | |
| 109 | 54548-51-3 | Zn(NO3)2 | 0.1M | 200 C. | | | | |
| 110 | 54548-51-4 | Zn(NO3)2 | 0.1M | 250 C. | | | | |
| 111 | 54548-51-5 | Zn(NO3)2 | 0.1M | 300 C. | | | | |
| 112 | 54548-51-6 | Zn(NO3)2 | 0.1M | 350 C. | | | | |
| 113 | 54548-51-7 | Zn(NO3)2 | 0.1M | 400 C. | | | y | |
| 114 | | | | | | | | |
| 115 | 54548-52-1 | K2TiO(C2O4)2 | 0.1M | 250–260 C. | 6000–7500 | | y | |
| 116 | 54548-52-2 | Zr complex + Sm(NO3)3 | .1M/10-3M | 400 C. | 7000–7500 | small | y | |
| 117 | | | | | | | | |
| 118 | 54548-53-1 | K2TiO(C2O4)2/Na2SiO3 | .1M/.05M | 250–260 C. | 5–7.5 Kpsi | 400 cc | y | |
| 119 | 54548-53-2 | K2TiO(C2O4)2/Na2SiO3 | .1M/.05M | 300–310 C. | 6–7.5 Kpsi | 200 cc | y | |
| 120 | 54548-54-1 | K2TiO(C2O4)2/Na2SiO3 | 0.1M/0.1M | 250 C. | 6–7.5 Kpsi | <200 cc | n | |
| 121 | 54548-54-2 | K2TiO(C2O4)2/Na2SiO3 | .05M/.05M | 200 C. | 5.5–7.5 Kpsi | 600 cc | y | |
| 122 | 54548-54-3 | K2TiO(C2O4)2/Na2SiO3 | .05M/.05M | 250 C. | 5.5–7.5 Kpsi | 50 cc | y | |
| 123 | | | | | | | | |
| 124 | 54548-54-4 | Na2SiO3 | .1M | 100 C. | 5–8 Kpsi | 50 cc | | |
| 125 | 54548-54-5 | Na2SiO3 | .05M | 200 C. | 5–8 Kpsi | 25 cc | | |
| 126 | | | | | | | | |
| 127 | 54548-55-1 | Zr citrate amm. comp | 0.1M | 400 C. | 7–8 Kpsi | 500 cc | y | |
| 128 | 54548-55-2 | Zr citrate amm. comp | 0.1M | 400 C. | 7–8 Kpsi | 250 cc | y | |
| 129 | | | | | | | | |
| 130 | 54548-55-3 | ZrO(NO3)2 | 0.1M | 350 C. | 5.5–7.5 Kpsi | | y | |
| 131 | 54548-55-4 | ZrO(NO3)2 | 0.1M | 400 C. | 6.5–7.5 Kpsi | | y | |
| 132 | | | | | | | | |
| 133 | 54548-56-1 | Zr citrate amm. comp | 0.1M | 400–410 C. | 6–7.5 Kpsi | 1 liter | y | |

TABLE 6-continued

Laboratory Data

| | A Sample Number | B Precursor | C Concentration | D Temperature | E Pressure | F Amount | G Powder | H Prod wt |
|---|---|---|---|---|---|---|---|---|
| 1 | | | | | | | | |
| 134 | | | | | | | | |
| 135 | 54548-56-2a | Zr citrate amm. comp | 0.1M | 400–410 C. | 6.5–7.5 Kpsi | 1 liter | y | |
| 136 | 54548-56-2b | Zr citrate amm. comp | 0.1M | 400–410 C. | 6.5–7.5 Kpsi | 700 cc | y | |
| 137 | 54548-56-2c | Zr citrate amm. comp | 0.1M | 400–410 C. | 6.5–7.5 Kpsi | 400 cc | y | |
| 138 | 54548-57-1 | Zr citrate amm. comp | 0.1M | 400–410 C. | 6.5–7.5 Kpsi | 400 cc | y | |
| 139 | | | | | | | | |
| 140 | 54548-57-2 | Mg(NO3)2/Al(NO3)3/urea | .066/.033/0.5M | 300 C. | 6–8 Kpsi | none | n | |
| 141 | 54548-57-3 | Mg(NO3)2/Al(NO3)3 | .066/.033M | 250–300 C. | 6–8 Kpsi | <100 cc | y | |
| 142 | | | | | | | | |
| 143 | 54548-60-1 | Mg(NO3)2 | 0.1M | 250 C. | 6–8 Kpsi | ~10 cc | n | |
| 144 | 54548-60-2 | Mg(NO3)2 | 0.1M | 400 C. | 6.5–8 Kpsi | ~10 cc | n | |
| 145 | 54548-60-3 | Mg(NO3)2 | 0.1M | 350 C. | 6.5–8 Kpsi | ~10 cc | n | |
| 146 | 54548-61-1 | Mg(NO3)2 | 0.1M | 300 C. | 6–8 Kpsi | ~10 cc | n | |
| 147 | 54548-61-2 | Mg(NO3)2 | 0.1M | 200 C. | 6–8 Kpsi | ~10 cc | n | |
| 148 | | | | | | | | |
| 149 | 54548-61-3 | MgSO4 | 0.1M | 200 C. | 6–8 Kpsi | ~10 cc | n | |
| 150 | 54548-61-4 | MgSO4 | 0.1M | 225 C. | 6–8 Kpsi | ~10 cc | y | |
| 151 | | | | | | | | |
| 152 | 54548-66-1 | Cr(NO3)3/Ni(NO3)2/urea | 20%/80%/0.5M | 357–363 C. | 6.5–7.5 Kpsi | 450 cc? | y | |
| 153 | | | | | | | | |
| 154 | | | | | | | | |
| 155 | 54548-66-2 | Zn(NO3)2/Cu(NO3)2 | 0.05M/0.05M | 350–360 C. | 6.5–7.5 Kpsi | 150 cc | n | |
| 156 | | | | | | | | |
| 157 | 54548-66-3 | Zn(NO3)2/Cu(NO3)2/urea | .05M/.05M/.5M | 350–380 C. | 6.5–7.5 Kpsi | 100 cc | y | |
| 158 | | | | | | | | |
| 159 | 54548-67-1 | Zn(NO3)2/Fe(NO3)3 | .033M/.066M | 350–355 C. | 6.5–7.5 Kpsi | 200 cc | y | |
| 160 | 54548-67-2 | Zn(NO3)2/Fe(NO3)3/urea | .033M/.066M/.5 | 330–380 C. | 6.5–7.5 Kpsi | 200 cc | y | |
| 161 | | | | | | | | |
| 162 | 54548-67-3 | Ni(NO3)2/Cr(NO3)/urea | 200 g/29.4 g/ 225 g/7.5 liters | 330–350 C. | 6–8 kpsi | 3 liters | y | |
| 163 | | | | | | | | |
| 164 | | | | | | | | |
| 165 | 54548-67-4 | ZrO(NO3)2 | 0.1M | 350–375 C. | 6–7.5 kpsi | 750 cc | y | |
| 166 | | | | | | | | |
| 167 | 54548-68-1 | ZrO(NO3)2/H2SO4 | 0.1M/21 cc/2 L | — | — | | | |
| 168 | 54548-68-2 | Zr cit. amm. comp/H2SO4 | 0.1M/21 cc/2 L | 350–360 C. | 6–7.5 kpsi | 900 cc | y | |
| 169 | 54548-68-3 | ZrO(NO3)2/H2SO4 | 0.1M/21 cc/2 L | 350–360 C. | 6–7.5 kpsi | 900 cc | y | |
| 170 | | | | | | | | |
| 171 | 54548-68-4 | Zr cit. amm. comp/H2SO4 | 138 g/42 cc/4 L | 350–370 C. | 6–7.5 kpsi | 2 liters | y | |
| 172 | 54548-68-5 | Zr cit. amm. comp/H2SO4 | 138 g/42 cc/4 L | 350–380 C. | 5–7 kpsi | 1.75 liters | y | |
| 173 | | | | | | | | |
| 174 | 54548-69-1 | Fe(NO3)3/H3PO4 | 0.1M/0.1M | 200 C. | 6–8 kpsi | 200 cc | n | |
| 175 | 54548-69-2 | Fe(NO3)3/H3PO4 | 0.1M/0.1M | 250 C. | 6.5–8 kpsi | 200 cc | y | |
| 176 | 54548-69-3 | Fe(NO3)3/H3PO4 | 0.1M/0.1M | 220–230 C. | 6.5–8 kpsi | 150–200 cc | y | |
| 177 | 54548-69-4 | Fe(NO3)3/H3PO4 | 0.05M/0.05M | 250–260 C. | 6.5–8 kpsi | | y | |
| 178 | | | | | | | | |
| 179 | 54548-70-1 | Zr cit. amm. comp/H2SO4 | 0.1M/21 cc/2 L | 350–360 C. | 6–7.5 kpsi | 1.1 L | y | |
| 180 | | | | | | | | |
| 181 | 54548-70-2 | Zr cit. amm. comp/Na2SO4 | 0.1M/28.4 g/2 L | 350–360 C. | 6–7.5 kpsi | 1+ L | y | |
| 182 | | | | | | | | |
| 183 | 54548-70-3 | Zr cit. amm. comp/(NH4)2SO4 | 0.1M/26.4 g/2 L | 350–360 C. | 6–7.5 kpsi | 1.1 L | y | |
| 184 | | | | | | | | |
| 185 | 54548-71-1 | Mg(NO3)3 | 0.1M | 150 C. | 5–7 kpsi | | n | |
| 186 | 54548-71-2 | Mg(NO3)3 | 0.1M | 250 C. | 5–7 kpsi | | n | |
| 187 | 54548-71-3 | Mg(NO3)3 | 0.1M | 350 C. | 5–7 kpsi | | n | |
| 188 | | | | | | | | |
| 189 | 54548-71-4 | Mg(NO3)3/urea | 0.1M/1.0M | 200 C. ± 3 | 5.4–7.4 kpsi | 700 cc | n | |
| 190 | 54548-72-1 | Mg(NO3)3/urea | 0.1M/1.0M | 225–250 C. | | 100 cc | y | |
| 191 | 54548-72-2 | Mg(NO3)3 | 0.5M | 350 C. | 6–7.5 kpsi | 100 cc | n | |
| 192 | | | | | | | | |
| 193 | 54548-72-3 | CoSO4 | 0.1M | 200 C. | 6–7.5 kpsi | 100 cc | n | |
| 194 | 54548-72-4 | CoSO4 | 0.1M | 300 C. | 6–7.5 kpsi | | y | |
| 195 | 54548-72-5 | CoSO4 | 0.1M | 250 C. | 6.8–7.5 kpsi | | y | |
| 196 | 54548-72-6 | CoSO4 | 0.1M | | | | y | |
| 197 | | | | | | | | |
| 198 | 54548-73-1 | Fe(NO3)3/(NH4)2HPO4 plus HNO3 | 0.1M/0.1M enough to dissolve | 225–250 | 6–8 kpsi | 500 cc | y | |
| 199 | | | | | | | | |
| 200 | | | | | | | | |
| 201 | 54548-73-2 | Fe(NO3)3/KH2PO4 | 0.1M/0.1M | 250 ± 10 | 6–7.6 kpsi | 200 cc | y | |
| 202 | 54548-74-1 | Fe(NO3)3/KH2PO4 | 0.1M/0.1M | 250–270 C. | 6–7.6 kpsi | ~750 cc | y | |
| 203 | | | | | | | | |
| 204 | 54548-74-2 | Fe(NO3)3/KH2PO4 | 0.1M/0.1M | 260 ± 10 C. | >5.8 kpsi | ~650 cc | y | |
| 205 | | | | | | | | |
| 206 | 54548-74-3 | Fe(NO3)3/KH2PO4 | 0.1M/0.5M | not heated | not press. | 1 liter | y | |
| 207 | | | | | | | | |

TABLE 6-continued

Laboratory Data

| 1 | A Sample Number | B Precursor | C Concentration | D Temperature | E Pressure | F Amount | G Powder | H Prod wt |
|---|---|---|---|---|---|---|---|---|
| 208 | 54548-75-1 | Fe(NO3)3/H3PO4/urea | 0.1M/0.5M/1.0M | 250–300 C. | 5–7.6 kpsi | 250 cc | y | |
| 210 | 54548-75-2 | Zr cit. amm. comp/(NH4)2SO4 | 0.1M/0.1M | 250 ± 10 C. | 5–7 kpsi | 500 cc | y | |
| 211 | 54548-75-3 | Zr cit. amm. comp/(NH4)2SO4 | 0.1M/0.1M | 300 ± 5 C. | 5–7 kpsi | 500 cc | y | |
| 212 | 54548-75-4 | Zr cit. amm. comp/(NH4)2SO4 | 0.1M/0.1M | 350 ± 10 C. | 5–7 kpsi | 500 cc | y | |
| 214 | 54548-77-1 | ZrO(NO3)2/(NH4)2SO4 | 0.1M/0.5M | 250 ± 5 C. | 5.4–7 kpsi | 400 cc | y | |
| 216 | 54548-77-2 | ZrO(NO3)2/(NH4)2SO4 | 0.1M/0.5M | 300 ± 5 C. | 5.4–7 kpsi | 600 cc | y | |
| 218 | 54548-77-3 | ZrO(NO3)2/(NH4)2SO4 | 0.1M/0.5M | 350 ± 10 C. | 5.8–7 kpsi | 500 cc | y | |
| 221 | 54548-77-4 | ZrO(NO3)2/(NH4)2SO4 | 0.1M/0.1M | na | na | 2 liter | y | |
| 223 | 54548-77-5 | ZrO(NO3)2/H2SO4 | 0.1M/0.05M | na | na | 2 liter | y | |
| 225 | 54548-79-1 | ZrO(NO3)2/H2SO4 | 0.1M/0.5M | 250 ± 5 C. | 5.4–7 kpsi | 400 cc | y | |
| 227 | 54548-79-2 | ZrO(NO3)2/H2SO4 | 0.1M/0.5M | 300 ± 5 C. | 5–7 kpsi | 600 cc | y | |
| 229 | 54548-79-3 | ZrO(NO3)2/H2SO4 | 0.1M/0.5M | 350 ± 5 C. | 5.4–7 kpsi | 550 cc | y | |
| 231 | 54548-80-1 | ZrO(NO3)2/(NH4)2SO4 | 0.1M/1.0M | 250 ± 5 C. | 5–6.8 kpsi | 400 cc | n | |
| 232 | 54548-80-2 | ZrO(NO3)2/(NH4)2SO4 | 0.1M/1.0M | 300 ± 5 C. | 5.2–7 kpsi | 500 cc | y | |
| 233 | 54548-80-3 | ZrO(NO3)2/(NH4)2SO4 | 0.1M/1.0M | 350 ± 30 C. | 6–7 kpsi | 500 cc | y | |
| 235 | 54548-83-3 | ZrO(NO3)2/H2SO4 | 0.1M/1.0M | 250 ± 5 C. | 4.2–6.2 kpsi | 500+ cc | n | |
| 237 | 54548-84-1 | ZrO(NO3)2/Y(NO3)2 | .084M/.016M | 300 ± 3 C. | 5–7 Kpsi | 750 cc | y | |
| 238 | 54548-84-2 | ZrO(NO3)2/Y(NO3)2 | .084M/.016M | 300 ± 5 C. | 5–7 Kpsi | 1.3 liters | y | |
| 240 | 54548-85-1 | ZrO(NO3)2 | 0.1M | 300 ± 5 C. | 5.2–7 Kpsi | 1.2 liters | y | |
| 242 | 54548-85-2 | Ti(NH3)2(OH)2(CH3CH(OH)COOH)2 | 0.1M | 250 ± 3 C. | 5–6.8 Kpsi | 1250 cc | y | |
| 244 | 54548-86-1 | Ti soln./Ba(NO3)2/urea | .05M/.05M/1.0M | 300 C. | | 500 cc | y | |
| 246 | 54548-86-2 | Co(NO3)2 | 0.1M | 250 ± 2 C. | 5–6.6 Kpsi | 250 cc | n | |
| 247 | 54548-86-3 | Co(NO3)2 | 0.1M | 300 ± 4 C. | 5–6.6 Kpsi | 250 cc | n | |
| 249 | 54548-86-4 | Co(II) acetate/urea | 0.1M/0.5M | 250 ± 10 C. | 5–6.8 Kpsi | 900 cc | y | |
| 251 | 54548-87-1 | Co(II) acetate | 0.1M | 250 ± 10 C. | 4.8–6.8 Kpsi | 800 cc | | |
| 253 | 54548-87-2 | "acid Molybdic" | 0.1M | 250 ± 5 C. | 4.8–6.8 Kpsi | | n | |
| 254 | 54548-87-3 | "acid Molybdic" | 0.1M | 300 ± 5 C. | 4.8–6.8 Kpsi | | n | |
| 255 | 54548-87-4 | "acid Molybdic" | 0.1M | 350 C. | 5.2–6.8 Kpsi | | n | |
| 257 | 54548-88-1 | Zr cit. amm. comp/H2SO4 | 0.1M/0.2M | 350–360 C. | 5–7 Kpsi | 1 liter | y | |
| 259 | 54548-88-2 | ZrO(NO3)2/H2SO4 | 0.1M/0.2M | 350 ± 10 C. | 5.6–7.2 kpsi | 1 liter | y | |
| 261 | 54548-88-3 | Zr cit. amm. comp/amm sulfate | 0.1M/0.2M | 340–350 C. | 5–7 Kpsi | 1 liter | y | |
| 263 | 54548-89-1 | ZrO(NO3)2/amm sulfate | 0.1M/0.2M | 340–350 C. | 5.6–6.8 kpsi | 1 liter | y | |
| 265 | 54548-89-2 | (NH4)2Mo2O7 | 0.2M in Mo | 300 ± 5 C. | 5.0–7.0 kpsi | 600 cc | y | |
| 266 | 54548-89-3 | (NH4)2Mo2O7 | 0.2M in Mo | 350 ± 10 C. | 6.0–7.0 kpsi | 250 cc | y | |
| 268 | 54548-90-1 | (NH4)2Mo2O7/urea | 0.2M in Mo/1.0M | 300 ± 5 C. | 5–6.8 kpsi | did not save | n | |
| 269 | 54548-90-2 | (NH4)2Mo2O7 | 0.1M in Mo | 300 ± 2 C. | 4.8–6.8 kpsi | 700 cc | n | |
| 271 | 54548-90-3 | Co(II) acetate (Alfa) | 0.1M | 300 ± 5 C. | 4.8–6.8 kpsi | 1 liter | y | |
| 273 | 54548-91-1 | CO(II) acetate (Alfa) | 0.1M | 350 ± 5 C. | 4.8–6.8 kpsi | 800 cc | y | |
| 275 | 54548-92-2 | Fe(NO3)3/Ba(NO3)2 | 0.1M/0.15M | 300 C. (+5–0) | 4.4–5.8 kpsi | 1.0 liter | y | |
| 277 | 54548-93-1 | Fe(NO3)3/urea | 0.1M/0.5M | 300 C. ± 2 C. | 4.6–6.2 kpsi | 1.9 gallons | y | |
| 278 | 54548-93-2 | Fe(NO3)3/urea | 0.1M/0.5M | 300 C. ± 4 C. | 4.3–6.2 kpsi | 1.9 gallons | y | |
| 280 | 54548-94-1 | K2TiO(C2O4)2 | 0.1M | 250 ± 5 C. | 4.5–6.0 kpsi | 2 liters | y | |

TABLE 6-continued

Laboratory Data

| 1 | A Sample Number | B Precursor | C Concentration | D Temperature | E Pressure | F Amount | G Powder | H Prod wt |
|---|---|---|---|---|---|---|---|---|
| 282 | 54548-94-2 | Ti(NH3)2(OH)2(CH3CH(OH)COOH)2 | 0.1M | 300 ± 3 C. | 4.2–6.5 Kpsi | 2 liters | y | |
| 284 | 54548-94-3 | ZrOCl2/(NH4)2SO4 | 0.1M/0.2M | 350 ± 5 C. | 4.5–6.0 kpsi | 2 liters | y | 30.57 g |
| 286 | 54548-95-1 | ZrOCl2/H2SO4 | 0.1M/0.2M | 350 ± 5 C. | 4.8–6.0 kpsi | 1.5 liters | y | 17.63 g |
| 288 | 54548-95-2 | Zr cit. amm. comp/amm sulfate | 0.1M/0.1M | 340–360 C. | 4.8–6.0 Kpsi | 1 liter | y | 9.12 g |
| 289 | 54548-95-3 | Zr cit. amm. comp/amm sulfate | 0.1M/0.2M | 340–360 C. | 4.8–6.0 Kpsi | 1 liter | y | 7.85 g |
| 290 | 54548-95-4 | Zr cit. amm. comp/amm sulfate | 0.1M/0.5M | 340–360 C. | 4.8–6.0 Kpsi | 1 liter | y | 8.46 g |
| 292 | 54548-96-1 | Zr cit. amm. comp/amm sulfate | 0.1M/0.2M | 340–360 C. | 4.5–6.0 Kpsi | 1 liter | y | 7.30 g |
| 294 | 54548-96-2 | ZrO(NO3)2/H2SO4 | 0.1M/0.2M | 250 ± 5 C. | 4.0–5.8 kpsi | 1.3 liter | y | 0.76 g |
| 296 | 54548-96-3 | ZrO(NO3)2/H2SO4 | 0.1M/0.2M | 300 ± 5 C. | 4.2–5.8 kpsi | 1.0 liter | y | 5.29 g |
| 297 | 54548-96-4 | ZrO(NO3)2/H2SO4 | 0.1M/0.2M | 350 ± 5 C. | 4.4–6.0 kpsi | 1.0 liter | y | 9.16 g |
| 299 | 54548-97-1 | Zr cit. amm. comp/amm sulfate | 0.1M/0.2M | 250–255° C. | 4.0–6.0 Kpsi | 1 liter | n | |
| 300 | 54548-97-2 | Zr cit. amm. comp/amm sulfate | 0.1M/0.2M | 300–305° C. | 4.0–6.0 Kpsi | 1 liter | n | |
| 301 | 54548-97-3 | Zr cit. amm. comp/amm sulfate | 0.1M/0.2M | 340–360° C. | 4.8–6.0 Kpsi | 1 liter | y | 8.7 g |
| 303 | 54548-97-4 | Zr cit. comp/amm sulfate/urea | .1M/.2M/.5M | 300–305 C. | 4.2–5.8 Kpsi | 500 cc | n | |
| 304 | 54548-97-5 | Zr cit. comp/amm sulfate/urea | .1M/.2M/.5M | 350 ± 10 C. | 4.8–6.0 Kpsi | 500 cc | y | 2.5 g |
| 306 | 54548-98-1 | ZrO(NO3)2/amm sulfate/urea | .1M/1.0M/.5M | 300 ± 2 C. | 4.0–5.8 Kpsi | 1.0 liter | y | 26.0 g |
| 308 | 54548-98-2 | ZrO(NO3)2/amm sulfate/urea | .1M/1.0M/.5M | 330 ± 5 C. | 4.4–5.8 Kpsi | 1.0 liter | y | 29.2 g |
| 310 | 54548-99-1 | Cu(NO3)2/urea | 0.1M/0.5M | 250 C. | | 300 cc | y | |
| 312 | 54548-99-2 | Zr(SO4)2 | 0.1M | 300 ± 5 C. | 4–5.8 kpsi | 2 liters | y | 0.5 g |
| 314 | 54548-99 3 | Zr(SO4)2 | 0.1M | 350 ± 10 C. | 4–5.8 kpsi | 2.2 liters | y | 6.23 g |
| 316 | 54548-99-4 | Zr(SO4)2/urea | 0.1M/0.25M | 350 ± 5 C. (±10 C.) | 4.4–5.8 kpsi | 2.0 liters | y | 9.70 g |
| 318 | 54548-100-1 | Zr(SO4)2/urea | 0.1M/0.125M | 350 ± 5 C. | 4.4–5.8 kpsi | 2.0 liters | y | 10.1 g |
| 320 | 54548-100-2 | Zr(SO4)2/urea | 0.1M/0.15M | 350 ± 5 C. | 4.4–5.8 kpsi | 2.0 liters | y | ?? |
| 322 | 54548-100-3 | K2TiO(C2O4)2/(NH4)2SO4 | 0.1M/0.025M | 250 ± 5° C. | 4.2–6.2 Kpsi | 1 liter | y | 4.7 g |
| 324 | 54548-101-1 | ZrO(NO3)2 | 0.1M | 350 ± 25 C.? | variable | 800 cc | y | |
| 326 | 54548-101-2 | ZrO(NO3)2/urea | .1M/0.25M | 340–350 C. | 4–5 Kpsi | 900–950 cc | y | |
| 328 | 54548-101-3 | ZrO(NO3)2/urea | .2M/0.5M | 340–350 C. | 4.5–5.5 Kpsi | 2 liters | y | |
| 330 | 54548-101-4 | ZrO(NO3)2/urea | .1M/0.125M | 345 ± 2 C. | 4.5–5.5 Kpsi | 1 liter | y | |
| 332 | 54548-102-1 | ZrO(NO3)2/urea | .1M/0.125M | 345 ± 2 C. | 4.5–5.5 Kpsi | 1 liter | y | |
| 334 | 54548-102-3 | Zr(SO4)2/urea | 0.1M/0.25M | 300 ± 5 C. | 4.4–5.4 kpsi | 2.0 liters | y | |
| 336 | 54548-102-4 | Zr(SO4)2/urea | 0.1M/0.25M | 350 ± 5 C. | 4.6–5.6 kpsi | 2.0 liters | y | |
| 338 | 54548-103-1 | Zr(SO4)2/NH4OH | 0.1M/0.25M | not heated | na | 2 liters | y | |
| 340 | 54548-103-2 | Zr(SO4)2/Fe(NO3)3/urea | .1M/.01M/.25M | 350 ± 5 C. | 4.6–5.6 kpsi | 2 liters | y | |
| 342 | 54548-103-3 | ZrO(NO3)2/Cr(NO3)3/urea | .1/.01/.125M | 350 ± 5 C. | 4.6–5.6 kpsi | 1 liter | y | 15.88 g |
| 344 | 54548-103-4 | ZrO(NO3)2/Co(NO3)2/urea | .1/.01/.125M | 350 ± 5 C. | 4.6–5.6 kpsi | 1 liter | y | 12.70 g |
| 346 | 54548-104-1 | ZrO(NO3)2/Cu(NO3)2/urea | .1/.01/.125M | 350 ± 5 C. | 4.4–5.8 kpsi | 1 liter | y | 15.66 g |
| 348 | 54548-105-1 | Zr(SO4)2/urea | 0.1M/0.25M | 300 ± 5 C. | 4.2–5.6 kpsi | ~1900 cc | y | |
| 350 | 54548-105-2 | Zr(SO4)2/urea | 0.1M/0.25M | 325 ± 5 C. | 4.4–5.6 kpsi | 2 liters | y | |
| 352 | 54548-105-3 | Zr(SO4)2/urea | 0.1M/0.25M | 350 ± 5 C. | 4.6–5.8 kpsi | 2 liters | y | |
| 353 | 54548-105-4 | Zr(SO4)2/urea | 0.1M/0.25M | 375 ± 10 C. | 5.0–5.8 kpsi | 2 liters | y | |
| 355 | 54548-105-5 | Zr(SO4)2/urea | 0.1M/0.25M | 400 ± 10 C. | 5.2–5.8 kpsi | 2 liters | y | |

TABLE 6-continued

Laboratory Data

| 1 | A<br>Sample Number | B<br>Precursor | C<br>Concentration | D<br>Temperature | E<br>Pressure | F<br>Amount | G<br>Powder | H<br>Prod wt |
|---|---|---|---|---|---|---|---|---|
| 357 | 54548-106-1 | ZrO(NO3)2/urea | .14M/0.25M | 325 ± 5 C. | 4.0–5.4 Kpsi | 2 liter | y | |
| 358 | 54548-106-2 | ZrO(NO3)2/urea | .14M/0.25M | 350 ± 5 C. | 4.0–5.6 Kpsi | 2 liter | y | |
| 359 | 54548-107-1 | ZrO(NO3)2/urea | .14M/0.25M | 375 ± 5 C. | 5.0–5.6 Kpsi | 2 liter | y | |
| 361 | 54548-107-2 | Al(NO3)3/Sr(NO3)2/urea | .1M/.0083M/.5M | 250 ± 10° C. | 4.5–5.4 Kpsi | 1 liter | y | |
| 363 | 54548-108-1 | Al(NO3)3/Sr(NO3)2/urea | .1M/.0083M/.5M | 300 ± 5° C. | 4.0–5.2 Kpsi | 1 liter | y | |
| 365 | 54548-108-2 | Al(NO3)3/Sr(NO3)2/urea | .1M/.0083M/.5M | 350 ± 5° C. | 4.2–5.42 Kpsi | 1 liter | y | |
| 367 | 54548-108-3 | Ce(NO3)3 | 0.1M | 300 ± 5° C. | 4.2–5.4 kpsi | 450 cc | y | |
| 369 | 54548-108-4 | Ce(NO3)3/urea | 0.1M/0.5M | 300 ± 15° C. | 4.2–5.4 kpsi | 300 cc | y | |
| 371 | 54548-109-1 | ZrO(NO3)2/Ce(NO3)3 | .0889M/.0112M | 300–350 | | 1900 cc | y | |
| 373 | 54548-109-2 | ZrO(NO3)2/Ce(NO3)3/urea | .0889M/.0112M/<br>.25M | 325 ± 5° C. | 4.2–5.2 Kpsi | 1900 cc | y | |
| 376 | 54548-111-1 | Zr(SO4)2/H2SO4/urea | .1M/.1M/0.5M | 325 ± 5° C. | 4.0–5.2 Kpsi | 2 liters | y | |
| 377 | 54548-111-2 | Zr(SO4)2/H2SO4/urea | .1M/.1M/0.5M | 350 ± 5° C. | 4.0–5.0 Kpsi | 2 liters | y | |
| 378 | 54548-111-3 | Zr(SO4)2/H2SO4/urea | .1M/.1M/0.5M | 375 ± 15° C. | 4.0–5.0 Kpsi | 2 liters | y | |
| 380 | 54548-113-1 | Zr(SO4)2/urea | 0.1M/0.25M | 325 ± 5° C. | 4.0–5.0 kpsi | 2 liters | y | |
| 383 | 54548-113-2 | Zr(SO4)2/urea | 0.1M/0.25M | 350 ± 5° C. | 4.0–5.0 kpsi | 2 liters | y | |
| 384 | 54548-113-3 | Zr(SO4)2/urea | 0.1M/0.25M | 375 ± 5° C. | 4.6–5.0 kpsi | 1.5 liters | y | |
| 386 | 54548-114-1 | K2TiO(C2O4)2/PdCl2 | 0.1M/.001M | 250 ± 5° C. | 4.4–5.6 Kpsi | 4 liters | y | |
| 388 | 54548-115-1 | K2TiO(C2O4)2/PdCl2 | 0.1M/.0001M | 250 ± 5° C. | 4.4–5.6 Kpsi | 4 liters | y | |
| 390 | 54548-116-1 | ZrO(NO3)2/PdCl2/urea | 0.1M/.001M/<br>.25M | 350 ± 5° C. | 4.4–5.6 Kpsi | 4 liters | y | |
| 392 | 54548-116-2 | ZrO(NO3)2/Ni(NO3)2 | 0.1M/0.01M | 225–350° C. | 4.4–5.6 Kpsi | 1 liter | y | |
| 394 | 54548-116-3 | ZrO(NO3)2/Ni(NO3)2/urea | .1M/.01M/.125M | 350 ± 5° C. | 4.4–5.6 Kpsi | 1 liter | y | |
| 396 | 54548-117-1 | Zr(SO4)2/urea/Fe(NO3)3 | 0.1M/0.25M/<br>1.5% of Zr | 350 ± 10° C. | 4.4–5.6 kpsi | 1 liter | y | |
| 399 | 54548-117-2 | ZrO(NO3)2/urea/<br>Fe(NO3)3/(NH4)2SO4 | 0.1M/0.25M/<br>1.5%/0.2M | 350 ± 10° C. | 4.4–5.6 kpsi | 1 liter | y | |
| 402 | 54548-117-3 | Zr(SO4)2/urea | 0.084M/0.25M | 350 ± 10° C. | 4.4–5.6 kpsi | 8 liters | y | |
| 404 | 54548-118-1 | Zr(SO4)2/urea | 0.1M/.25M | 350 ± 10° C. | 4.4–5.6 kpsi | 4 liters | y | |
| 407 | 54548-118-2 | Zr(SO4)2/urea/<br>Fe(NO3)3/MnSO4 | 0.1M/0.25M/<br>1.5%, 0.5% of Zr | 350 ± 10° C. | 4.0–5.6 kpsi | 1 liter | y | |
| 410 | 54548-118-3 | ZrO(NO3)2/urea/(NH4)2SO4<br>Fe(NO3)3/MnSO4 | 0.1M/0.25M/0.2M<br>1.5%/0.5% of Zr | 350 ± 10° C. | 4.6–5.6 kpsi | 1 liter | y | |
| 413 | 54548-119-1 | Zr(SO4)2/urea/<br>Fe(NO3)3/MnSO4 | 0.1M/0.25M/<br>1.0%, 1.0% of Zr | 350 ± 10° C. | 4.6–5.6 kpsi | 1 liter | y | |
| 416 | 54548-119-2 | Zr(SO4)2/urea/<br>Fe(NO3)3/MnSO4 | 0.1M/0.25M/<br>0.5%, 1.5% of Zr | 350 ± 10° C. | 4.6–5.6 kpsi | 1 liter | y | |
| 419 | 54548-120-1 | ZrO(NO3)2/Ce(NO3)3 | 0.1M total metal<br>88.8% Zr/<br>11.2% Ce | 350 ± 10? °C. | 4.5–5.6 kpsi | 1 liter | y | |
| 422 | 54548-120-2 | ZrO(NO3)2/Ce(NO3)3/urea | as above,<br>.25M urea | 350 ± 5° C. | 4.2–5.4 kpsi | 1 liter | y | |
| 425 | 54548-120-3 | ZrO(NO3)2/Ce(NO3)3/urea | as above,<br>.175M urea | 350 ± 5° C. | 4.2–5.4 kpsi | 1 liter | y | |
| 428 | 54548-120-4 | ZrO(NO3)2/Ce(O3)3/urea | as above,<br>.125M urea | 350 ± 5° C. | 4.2–5.4 kpsi | 1 liter | y | |

TABLE 6-continued

Laboratory Data

| Sample Number | Precursor | Concentration | Temperature | Pressure | Amount | Powder | Prod wt |
|---|---|---|---|---|---|---|---|
| 54548-121-1 | ZrO(NO3)2/Ce(NO3)3/urea | as above, .083M urea | 350 ± 5° C. | 4.2–5.4 kpsi | 1 liter | y | |
| 54548-121-2a and b | ZrO(NO3)2/urea | 0.1M/0.175M | 350 ± 5° C. | 4.4–5.4 kpsi | 8 liters | y | |
| 54548-122-1a and b | ZrO(NO3)2/urea | 0.1M/0.175M | 350 ± 5° C. | 4.0–5.4 kpsi | 2 × 2 liters | y | |
| 54548-122-2 | K2TiO(C2O4)2 (Noah) | 0.1M | 250 ± 5° C. | 4.0–5.4 kpsi | 2 liters | y | |
| 54548-123-1 | K2TiO(C2O4)2 (Noah) | 0.1M | 250 ± 5° C. | 4.0–5.2 kpsi | 1 liter | y | |
| 54548-123-2a and b | K2TiO(C2O4)2 (Noah) | 0.1M | 225 ± 5° C. | 4.4–5.0 kpsi | 2 × 2 liters | y | |
| 54548-123-3 | K2TiO(C2O4)2 (Noah) | 0.1M | 200 ± 5° C. | 4.4–5.0 kpsi | 2 liters | y | |
| 54548-124-1 | ZrO(NO3)2/Ce(NO3)3/urea | 0.1M total metal 88.8% Zr/11.2% Ce 0.1M urea | 350 ± 5° C. | 4.4–5.4 kpsi | 1 liter | y | |
| 54548-124-2 | Zr(SO4)2/Sm(NO3)3/urea | 0.1M/10e-3M/ 0.1M | 300 ± 5° C. | 3.8–5.4 kpsi | 1 liter | y | |
| 54548-124-3 | Zr(SO4)2/Sm(NO3)3/urea | 0.1M/10e-3M/ 0.1M | 325 ± 5° C. | 3.8–5.4 kpsi | 1 liter | y | |
| 54548-125-1 | Zr(SO4)2/Sm(NO3)3/urea | 0.1M/10e-3M/ 0.2M | 300 ± 5° C. | 4.0–5.2 kpsi | 500 cc | y | |
| 54548-125-2 | Zr(SO4)2/Sm(NO3)3/urea | 0.1M/10e-3M/ 0.2M | 325 ± 5° C. | 4.0–5.4 kpsi | 600 cc | y | |
| 54548-125-3 | Zr(SO4)2/Sm(NO3)3/urea | 0.1M/10e-3M/ 0.2M | 350 ± 5° C. | 4.0–5.4 kpsi | 700 cc | y | |
| 54548-125-4 | Zr(SO4)2/Sm(NO3)3/urea | 0.1M/10e-3M/ 0.2M | 375 ± 5° C. | 4.0–5.4 kpsi | 700 cc | y | |
| 54548-125-5 | Zr(SO4)2/Sm(NO3)3/urea | 0.1M/10e-3M/ 0.2M | 400 ± 15° C. | 4.0–5.4 kpsi | 400 cc | y | |

TABLE 7

Laboratory Data

| Sample Number | Precursor | Concentration | Temperature | Pressure | Amount | Powder |
|---|---|---|---|---|---|---|
| 52654-36-1 | Fe(CO)5 | 3 cc/50 cc vol | red heat | 2500 | | y |
| 52654-36-2 | Fe(CO)5 | " | " | " | | |

TABLE 7-continued

Laboratory Data

| Sample Number | Precursor | Concentration | Temperature | Pressure | Amount | Powder |
|---|---|---|---|---|---|---|
| 52654-36-3 | Fe(CO)5 | " | 300–350 C. | " | | y |
| 52654-37-1 | Mo(CO)6 | 3 cc/50 cc vol | 250 C. | 2500 | | y |
| 52654-38-1 | Fe(CO)5/Mo(CO)6 | 3 cc/.58 g/50 cc v | 350 C. | 2500 | | y |
| 52654-43-1 | Fe(NO3)3 | .1M | 225 C. | 7–8 Kpsi | 500 cc | y |
| 52654-43-2 | Fe(NO3)3 | .1M | 225 C. | 7–8 Kpsi | 500 cc | |
| 52654-44-1 | Fe(NO3)3/acetate buffer | 0.1M/xxx | 225 C. | 6–8 Kpsi | 650 cc | y |
| 52654-44-2 | Fe(NO3)3/acetate buffer | 0.1M/xxx | 225 C. | 6–8 Kpsi | 950 cc | y |
| 52654-44-3 | Fe(NO3)3/Ni(NO3)2 | .1/.1M 2:1 | 300 C. | 6–8 Kpsi | | |
| 52654-44-4 | Fe(NO3)3/Ni(NO3)2 | .1/.1M 2:1 | 350 C. | 6–8 Kpsi | | y |
| 52654-45-1 | Fe(NO3)3 | .1M | 300 C. | 6–8 Kpsi | 1.0 liter | y |
| 52654-45-2 | Fe(NO3)3 | .1M | 400 C. | 7–8 Kpsi | 1.0 liter | y |
| 52654-45-3 | Fe(NO3)3 | .1M | 225 C. | 6500–8000 | | |
| 52654-45-4 | Fe(NO3)3 | .1M | 200 C. | 6500–8000 | | |
| 52654-45-5 | Fe(NO3)3 | .1M | 250 C. | 6500–8000 | | |
| 52654-45-6 | Fe(NO3)3 | .1M | 300 C. | 6500–8000 | | |
| 52654-45-7 | Ni(NO3)2 | 0.1M | 300 C. | 7–8 Kpsi | | n |
| 52654-45-8 | Ni(NO3)2 | 0.1M | 350 C. | 7–8 Kpsi | | |
| 52654-46-1 | Ni(NO3)2 | 0.1M | 400 C. | 7–8 Kpsi | | n |
| 52654-46-3 | Ni(NO3)2 | 0.1M | 450 C. | 7400–8000 | | |
| 52654-46-3 | (NH4)6Mo7O24 | 0.1M | 150 C. | 6500–8000 | | n |
| 52654-46-4 | (NH4)6Mo7O24 | 0.1M | 250 C. | | | |
| 52654-46-5 | (NH4)6Mo7O24 | 0.1M | 350 C. | | | n |
| 52654-47-1 | (NH4)6Mo7O24 | 0.1M | 450 C. | | | |
| 52654-47-2 | (NH4)6Mo7O24 | 0.1M | | | | |
| 52654-47-3 | Al(NO3)3/urea | 0.1M/0.5M | 244–248 C. | 7000–8000 | | |
| 52654-47-4 | Al(NO3)3/urea | 0.1M/0.5M | 307–310 C. | 7000–8000 | | |
| 52654-48-1 | above plus NaOH | | room | ambient | | |
| 52654-48-2 | Al(NO3)3 + NaOH | 0.1M/4 g (s) | ambient | ambient | | |
| 52654-48-3 | Al(NO3)3/urea | 0.1M/0.5M | 250 C. | 6000–7000 | 280 cc | |
| 52654-49-1 | Fe(NO3)3 | .025M | 225 C. | 6000–8000 | | n |
| 52654-49-2 | Fe(NO3)3 | .025M | 300 C. | 6000–8000 | | n |
| 52654-49-3 | Fe(NO3)3 | .025M | 400 C. | 6000–8000 | | y |
| 52654-49-4 | Fe(NO3)3 | .05M | 225 C. | 6000–8000 | | y |
| 52654-49-5 | Fe(NO3)3 | .05M | 300 C. | 6000–8000 | | |
| 52654-49-6 | Fe(NO3)3 | .05M | 215–230 C. | 7000–8000 | 300 cc | y |
| 52654-49-6a | | | | | | |
| 52654-50-1 | Fe(NO3)3 | 0.1M | 225–230 C. | 6000–8000 | 400 cc | |
| 52654-50-2 | Fe(NO3)3/Cr(NO3)3 | 0.1M/0.01M | 300 C. | 6000–8000 | | y |
| 52654-50-3 | Fe(NO3)3/FeSO4 | .05M/.05M | 225 C. | 6000–8000 | | y |
| 52654-50-4 | " | " | 300 C. | 6000–8000 | | y |
| 52654-50-5 | " | " | 400 C. | 6000–8000 | | y |
| 52654-51-1 | Zr citrate ammonium cmplx | 0.1M | 350 C. | 6000–8000 | | y |
| 52654-51-2 | Zr citrate ammonium cmplx | 0.1M | 375 C. | 6000–8000 | | y |
| 52654-51-3 | Zr citrate ammonium cmplx | 0.1M | 400 C. | 6000–8000 | 500 cc | y |
| 52654-51-4 | Fe(NO3)3/MoCl3 | 0.1M/.00136M | 300 C. | 4000–6500 | | |
| 52654-51-5 | Fe(NO3)3/MoCl3 | 0.1M/.00136M | 350 C. | 4000–6500 | | |
| 52654-52-1 | Zr cmplx/Y(NO3)3 | 0.1M/0.005M | 400 C. | 6000–7000 | | y |
| 52654-52-2 | Zr cmplx/Y(NO3)3 | 0.1M/0.005M | 400 C. | 6000–7000 | | y |
| 52654-52-3 | Fe(NO3)3/(NH4)6Mo7O24 | .25M/.0025M | 300 C. | 4500–7000 | 500 cc | |
| 52654-52-4 | FeSO4 | 0.1M | 100 C. | 6000–7500 | | y |
| 52654-52-5 | FeSO4 | 0.1M | 150 C. | 6000–7500 | | y |
| 52654-52-6 | FeSO4 | 0.1M | 200 C. | 6000–7500 | | y |

TABLE 7-continued

Laboratory Data

| | A | B | C | D | E | F | G |
|---|---|---|---|---|---|---|---|
| 1 | Sample Number | Precursor | Concentration | Temperature | Pressure | Amount | Powder |
| 78 | 52654-53-1 A,B,C | Fe(NO3)3/acetate buffer | 0.1M/xxx | 225–232 C. | 5.5–7.5 Kpsi | 3 liters | y |
| 79 | 52 654-53-2 | Fe(NO3)3/acetate buffer | 0.1M/xxx | 225–232 C. | 5.5–7.5 Kpsi | 500 cc | y |
| 81 | 52 654-53-3 | Fe(NO3)3 | 0.1M | 300 C. | 5.5–7.5 Kpsi | 2.5 liters | |
| 82 | 52 654-53-4 | Fe(NO3)3 | 0.1M | 300 C. | 5.5–7.5 Kpsi | 0.5 liters | y |
| 84 | 52654-53-5 | Fe(NO3)3/acetate buffer | 0.1M/xxx | 275–280 C. | 6–7.5 Kpsi | 2 liters | y |
| 85 | 52654-53-6 | Fe(NO3)3/acetate buffer | 0.1M/xxx | 275–280 C. | 6–7.5 Kpsi | 200 cc | y |
| 86 | 52654-54-1 | Fe(NO3)3/acetate buffer | 0.1M/xxx | none | none | ~1 liter | y |
| 88 | 52654-54-2 | Fe(II)SO4/urea | 0.1M/0.5M | 300–320 C. | 6–7.5 Kpsi | 80 cc | y |
| 89 | 52654-54-3 | Fe(II)SO4/urea | 0.1M/0.5M | 300–320 C. | 6–7.5 Kpsi | 75 cc | y |
| 90 | 52654-54-4 | Fe(II)SO4/urea | 0.1M/0.5M | 250–270 C. | 6–7.5 Kpsi | 50 cc | y |
| 91 | 52654-54-5 | Fe(II)SO4/urea | 0.1M/0.5M | 200–225 C. | | 100 cc | y |
| 92 | 52654-54-6 | Fe(II)SO4/urea | 0.1M/0.5M | 350 C. | | 40 cc | y |
| 94 | 52654-55-1 | Fe(II)SO4 | 0.1M | 200 C. | 6–8 Kpsi | not retained | |
| 95 | 52654-55-2 | Fe(II)SO4 | 0.1M | 150 C. | 6–8 Kpsi | not retained | y |
| 96 | 52654-55-3 | Fe(II)SO4 | 0.1M | 300 C. | 6–8 Kpsi | not retained | y |
| 98 | 52654-56-1 | Fe(NH4)(SO4)2/Na2SO4 | 10.3 g/3 g/2 liter | 150 C. | 5.5–7 Kpsi | 500 cc | y |
| 100 | 52654-56-2 | Fe(NH4)(SO4)2/Na2SO4 | 10.3 g/3 g/2 liter | 200 C. | 5.5–7 Kpsi | 500 cc | y |
| 102 | 52654-56-3 | Fe(NO3)3/Na2SO4 | 16 g/3 g/2 liter | 150 C. | 5.5–7 Kpsi | | y |
| 103 | 52654-56-4 | Fe(NO3)3/Na2SO4 | 16 g/3 g/2 liter | 200 C. | 5.5–7 Kpsi | | y |
| 105 | 52654-57-1 | Fe(NO3)3 | 0.1M | 220–225 C. | 6–8 Kpsi | 1 liter | y |
| 107 | 52654-57-2 | Fe(NH4)(SO4)2 | 0.1M | 220–225 C. | 6–8 Kpsi | 900 cc | y |
| 109 | 52654-58-1 | Fe(NO3)3/Na2SO4 | 81 g/15 g/2 liter | 150–155 C. | 6–8 Kpsi | 1 liter | y |
| 111 | 52654-58-2 | Fe(NO3)3 | 0.1M | 200–210 C. | 6–7.5 Kpsi | 700 cc | y |
| 113 | 52654-58-3 | Fe(NO3)3/Na2SO4 | 162 g/32 g/4 l | 195–205 C. | 6–6.5 Kpsi | 1 liter | y |
| 115 | 52654-59-1 | Fe(II)SO4/urea | 0.05M/0.5M | 275–325 C. | 7–8 Kpsi | 1 liter | |
| 117 | 52654-59-2 | Fe(II)SO4/urea | 0.05M/0.5M | 275–325 C. | 7–8 Kpsi | 900 cc | y |
| 119 | 52654-59-3 | FeCl2/urea | 0.1M/0.5M | 300 C. | | | y |
| 121 | 52654-59-4 | Fe(II)SO4/urea | 0.05M/1.0M | 300 C. | | | y |
| 122 | 52654-59-5 | Fe(II)SO4/urea | 0.05M/1.0M | 300 C. | | | y |
| 124 | 52654-59-6 a–c | Fe(II)SO4/urea | 0.05M/.5M | 300 C. | 7–7.5 Kpsi | 2.5 liters | y |
| 126 | 52654-60-1 | Fe(NO3)3/Na2SO4 | 162 g/32 g/4 l | — | — | sample | |
| 128 | 52654-60-2 | Fe(NO3)3/Na2SO4 | .01M/6 g/4 l | 100 C. | 5–8 kpsi | 750 cc | y |
| 129 | 52654-60-3 | Fe(NO3)3/Na2SO4 | .01M/6 g/4 l | 125 C. | 5–8 kpsi | 750 cc | y |
| 130 | 52654-60-4 | Fe(NO3)3/Na2SO4 | .01M/6 g/4 l | 150 C. | 5–7.5 kpsi | 750 cc | y |
| 131 | 52654-60-5 | Fe(NO3)3/Na2SO4 | .01M/6 g/4 l | 200 C. | 5–7.5 kpsi | 750 cc | y |
| 133 | 52654-60-6 | Fe(NO3)3/Na2SO4 | .025M/15 g/4 l | 100 C. | 5.5–7.5 kpsi | 750 cc | y |
| 134 | 52654-60-7 | Fe(NO3)3/Na2SO4 | .025M/15 g/4 l | 125 C. | 5.5–7.5 kpsi | <750 cc | y |
| 135 | 52654-61-1 | Fe(NO3)3/Na2SO4 | .025M/15 g/4 l | 150 C. | 5.5–7.5 kpsi | 750 cc | y |
| 136 | 52654-61-2 | Fe(NO3)3/Na2SO4 | .025M/15 g/4 l | 200 C. | 5.5–7.5 kpsi | <750 cc | y |
| 138 | 52654-62-1 | Fe(NO3)3/urea | 0.1M/1.0M | 250–260 C. | 6–7.5 kpsi | 1.3 gallons | y |
| 139 | 52654-62-2 | Fe(NO3)3/urea | 0.1M/1.0M | 300 C. | 5.5–7.5 kpsi | ?? | y |
| 140 | 52654-62-3 | Fe(NO3)3/urea | 0.1M/1.0M | 300 C. | 6–7.5 kpsi | 500 cc | y |
| 141 | 52654-62-4 | Fe(NO3)3/urea | 0.1M/1.0M | 350 C. | 6–7.5 kpsi | 1.0 liter | y |
| 143 | 52654-63-1 a,b,c,d | Fe(NO3)3/urea | 0.1M/1.0M | 300 ± 5 C. | 5.5–7.5 kpsi | 2.4 liters | y |
| 144 | 52654-63-2 a,b,c,d | Fe(NO3)3/urea | 0.1M/1.0M | 300 ± 5 C. | 6–7.5 kpsi | 2.3 liters | y |
| 146 | 52654-65-1 | Fe(NO3)3/urea | 0.1M/1.0M | 270 ± 2 C. | 5.8–7.4 kpsi | several liters | y |
| 148 | 52654-65-2 | Fe(NO3)3/urea | 0.2M/1.0M | 270 ± 10 C. | 5.8–7.4 kpsi | 1.25 liters | y |
| 150 | 52654-66-1 | Fe(NO3)3/ | 0.1M metals/ | 275 ± 20 C. | 6.6–7.4 kpsi | 1.2 liter | y |

TABLE 7-continued

Laboratory Data

|  | A | B | C | D | E | F | G |
|---|---|---|---|---|---|---|---|
| 1 | Sample Number | Precursor | Concentration | Temperature | Pressure | Amount | Powder |
| 151 |  | (NH4)6Mo7O24/urea | Mo/Fe = .01/1.0M |  |  |  |  |
| 152 | 52654-66-2 | Fe(NO3)3/ | 0.1M metals/ | 275–300 C. | 6.0–7.4 kpsi | 1.2 liter | y |
| 153 |  | (NH4)6Mo7O24/urea | Mo/Fe = .02/1.0M |  |  |  |  |
| 154 | 52654-66-3 | Fe(NO3)3/ | 0.1M metals/ |  |  | 1.0–1.2 liter | y |
| 155 |  | (NH4)6Mo7O24/urea | Mo/Fe = .05/1.0M |  |  |  |  |
| 156 |  |  |  |  |  |  |  |
| 157 | 52654-67-1 | (NH4)6Mo7O24/urea | 0.1M/1.0M | 230–360 C. |  | ~800 cc |  |
| 158 |  |  |  |  |  |  |  |
| 159 | 52654-67-2 | Fe(NO3)3/urea | 0.1M/1.0M | 300 C. ± 10 | 5.8–7.4 kpsi | 1 liter | y |
| 160 | 52654-67-3 | Fe(NO3)3/urea | 0.1M/1.0M | 325 C. ± 10 | 5.8–7.4 kpsi | .9–1.0 liter | y |
| 161 |  |  |  |  |  |  |  |
| 162 | 52654-67-4 | Fe(NO3)3/urea | 0.1M/1.0M | 350 C. ± 10 | 6.0–7.4 kpsi | ? | y |
| 163 | 52654-68-1 | Fe(NO3)3/urea | 0.1M/1.0M | 250 C. ± 5 | 5.6–7.4 kpsi | 900 cc | y |
| 164 |  |  |  |  |  |  |  |
| 165 | 52654-68-2 | Fe(NO3)3/urea | 0.1M/1.0M | 265 C. ± 5 or better | 5.8–7.2 kpsi | 1 liter | y |
| 166 |  |  |  |  |  |  |  |
| 167 | 52654-68-3 | Fe(NO3)3/urea | 0.1M/1.0M | 290 C. ± 3 | 5.8–7.4 kpsi | 1 liter | y |
| 168 |  |  |  |  |  |  |  |
| 169 | 52654-68-4 | Fe(NO3)3/urea | 0.1M/1.0M | 305 C. ± 5 |  | 700 cc | y |
| 170 |  |  |  |  |  |  |  |
| 171 | 52654-69-1 | Fe(NO3)3/urea | 0.1M/1.0M | 320 C. ± 5 | 5.8–7.4 kpsi | 700 cc | y |
| 172 |  |  |  |  |  |  |  |
| 173 | 52654-69-2 | Fe(NO3)3/urea | 0.1M/1.0M | 272 C. ± 5 | 5.6–7.4 kpsi | 800 cc | y |
| 174 |  |  |  |  |  |  |  |
| 175 | 52654-69-3 | Fe(NO3)3/(NH4)2SO4 | 0.1M/0.1M | 25 C. ± 5 | 6–7.5 kpsi | 400 cc | y |
| 176 |  |  |  |  |  |  |  |
| 177 | 52654-69-4 | Fe(NO3)3/(NH4)2SO4 | 0.1M/0.1M | 200 C. ± 15 |  | 400 cc | y |
| 178 |  |  |  |  |  |  |  |
| 179 | 52654-70-1 | Fe(NO3)3/H2SO4 | 0.1M/1.0M | 125 C. ± 3 | 5.5–7.5 kpsi | 300 cc | n |
| 180 | 52654-70-2 | Fe(NO3)3/H2SO4 | 0.1M/1.0M | 200 C. ± 5 | 6.0–7.6 kpsi | 200 cc | n |
| 181 |  |  |  |  |  |  |  |
| 182 | 52654-70-3 | Fe(NO3)3/Na2SO4 | 0.1M/1.0M | 125 C. +5/-0 | 5.8–7.6 kpsi | 300 cc | n |
| 183 |  |  |  |  |  |  |  |
| 184 | 52654-70-4 | Fe(NO3)3/Na2SO4 | 0.1M/1.0M | 200 C. + 5 | 6.0–7.6 kpsi | 300 cc | y |
| 185 |  |  |  |  |  |  |  |
| 186 | 52654-70-5 | Fe(NO3)3/Na2SO4/NH4OH | .1M/1M/.04M | 125 C. |  | 150–200 cc | y |
| 187 |  |  |  |  |  |  |  |
| 188 | 52654-71-1 | Fe(NO3)3/Na2SO4/NH4OH | .1M/1M/.04M | 100 C. | 5.6–7.6 kpsi |  |  |
| 189 |  |  |  |  |  |  |  |
| 190 | 52654-71-2 | Fe(NO3)3/(NH4)2SO4/urea | .1M/1M/1M | 200 C. | 5.5–7.6 kpsi | 450 cc | y |
| 191 | 52654-71-3 | Fe(NO3)3/(NH4)2SO4/urea | .1M/1M/1M | 300 C. +10 -0 | 6.0–7.6 kpsi | 350 cc | y |
| 192 |  |  |  |  |  |  |  |
| 193 | 52654-72-1 | Fe(NO3)3/urea | .1M/1.0M | 310 ± 5 | 6.0–7.6 Kpsi | 1.2–1.3 gal | y |
| 194 |  |  |  |  |  |  |  |
| 195 | 52654-72-2 | Fe(NO3)3/urea | .1M/1.0M | 300 ± 10 C. | 5.4–7.0 Kpsi | 1200 cc | y |
| 196 | 52654-73-1 | Fe(NO3)3/urea | .1M/1.0M | 300 ± 10 C. | 5.4–7.0 Kpsi | 1800 cc | y |
| 197 | 52654-73-2 | Fe(NO3)3/urea | .1M/1.0M | 300 ± 10 C. | 5.4–7.0 Kpsi |  | y |
| 198 |  |  |  |  |  |  |  |
| 199 | 52654-73-3 | Fe(NO3)3/urea | .1M/1.0M | 300 ± 10 C. | 5.0–6.8 Kpsi | 5 liters | y |
| 200 |  |  |  |  |  |  |  |
| 201 | 52654-74-1 | Fe(NO3)3 | 0.1M | 300–310 C. | 5.0–7.0 Kpsi | 1200 cc | y |
| 202 | 52654-75-1 | Fe(NO3)3 | 0.1M | 375 ± 10 C. | 5.8–7.2 Kpsi | 1000 cc | y |
| 203 |  |  |  |  |  |  |  |
| 204 | 52654-76-1 | Fe(NO3)3/(NH4)2SO4/urea | 0.1M/0.1M/1M | 250 ± 5 C. | 5.8–7.2 Kpsi | 750 cc | y |
| 205 |  |  |  |  |  |  |  |
| 206 | 52654-76-2 | Fe(NO3)3/(NH4)2SO4/urea | 0.1M/0.1M/1M | 300 ± 5 C. | 5.2–6.8 Kpsi | 900 cc | y |
| 207 |  |  |  |  |  |  |  |
| 208 | 52654-76-3 | Fe(NO3)3/(NH4)2SO4/urea | 0.1M/0.5M/1M | 250 ± 5 C. | 5.0–7.0 Kpsi | 1000 cc | y |
| 209 |  |  |  |  |  |  |  |
| 210 | 52654-77-1 | Fe(NO3)3/(NH4)2SO4/urea | 0.1M/0.5M/1M | 300 ± 5 C. |  | 800 cc | y |
| 211 |  |  |  |  |  |  |  |
| 212 | 52654-77-2 | Fe(NO3)3/(NH4)2SO4/urea | .1M/1M/1M | 250 C. ± 10 | 6.0–7.2 kpsi | 700 cc | y |
| 213 |  |  |  |  |  |  |  |
| 214 | 52654-78-1a | K2TiO(C2O4)2 | 0.1M | 250 C. ± 2 | 5.2–6.8 kpsi | 700 cc | y |
| 215 | 52654-78-1b | K2TiO(C2O4)2 | 0.1M | 250 C. ± 2 | 5.2–6.8 kpsi | 700 cc | y |
| 216 |  |  |  |  |  |  |  |
| 217 | 52654-79-1 | Zn(SO4) | 0.1M | ?? | ?? | 250 cc | y |
| 218 |  |  |  |  |  |  |  |
| 219 | 52654-79-2 | Zn(NO3)2/urea | 0.1M/0.5M | 250–350 C. | ?? | 250 cc | y |
| 220 |  |  |  |  |  |  |  |
| 221 | 52654-81-1 | Fe(NO3)3/Co acetate/urea | .1M/0.01M/0.5M | 300 C. ± 5 | 4.5–6.8 kpsi | 1 liter | y |
| 222 | 52654-81-2 | Fe(NO3)3/Co acetate/urea | .1M/0.01M/1.0M | 300 C. ± 10 | 4.5–6.8 kpsi | 1 liter | y |
| 223 | 52654-81-3 | Fe(NO3)3/Co acetate/urea | .1M/0.001M/0.5M | 300 C. ± 5 | 4.2–6.0 kpsi | 1 liter | y |

TABLE 7-continued

Laboratory Data

| | Sample Number | Precursor | Concentration | Temperature | Pressure | Amount | Powder |
|---|---|---|---|---|---|---|---|
| | A | B | C | D | E | F | G |
| 1 | | | | | | | |
| 225 | 52654-81-4 | Fe(NO3)3/Ni(NO3)2/urea | .1M/0.01M/0.5M | 300 C. ± 15 | 4.4–6.8 kpsi | 1 liter | y |
| 226 | 52654-82-1 | Fe(NO3)3/Ni(NO3)2/urea | .1M/0.001M/0.5M | 300 C. ± 10 | 4.4–6.8 kpsi | 1 liter | y |
| 228 | 52654-82-2 | Fe(NO3)3/SnCl2/urea | .1M/0.01M/0.5M | 300 C. ± 105 | 4.2–6.8 kpsi | 1 liter | y |
| 230 | 52654-82-3 | Fe(NO3)3/SnCl2/urea | .1M/0.001M/0.5M | 300 C. ± 105 | 4.2–6.8 kpsi | 1 liter | y |
| 232 | 52654-82-4 | Fe(NO3)3/Cr(NO3)3/urea | .1M/0.01M/0.5M | 300 C. ± 10 | | 1 liter | y |
| 233 | 52654-83-1 | Fe(NO3)3/Cr(NO3)3/urea | .1M/0.001M/0.5M | 300 C. ± 5 | | 1 liter | y |
| 235 | 52654-83-2 | Fe(II)SO4/urea | .05M/.5M | 300 C. ± 20 C. | | 2 liters | y |
| 237 | 52654-83-3 | Fe(II)SO4/urea | .05M/.5M | boiled | atm | 300 cc | y |
| 239 | 52654-84-1 | Fe(NO3)3/ZrO(NO3)2/urea | .1M/0.01M/0.5M | 300 C. ± 15 | 4–7 kpsi | 1 liter | y |
| 241 | 52654-84-2 | ZrO(NO3)2/Fe(NO3)3/urea | .1M/0.01M/0.5M | 300 C. ± 5 | 4.5–5.8 kpsi | 1 liter | y |
| 243 | 52654-85-1 | amm. molybdate/thioacetamide | .1M/0.5M | boiled | atm | 300 cc | y |
| 245 | 52654-85-2 | Fe(NO3)3/urea | .1M/0.5M | 300 ± 10 | 4.2–6 Kpsi | 12 liters | y |
| 247 | 52654-87-1 | FeCl3 | 0.1M | 300 ± 5 | 4–6 Kpsi | 900 cc | y |
| 249 | 52654-87-2 | FeCl3/urea | 0.1M/0.5M | 300 ± 5 | | 900 cc | y |
| 251 | 52654-87-3 | Fe amm sulfate | 0.1M | 300 ± 5 | | 900 cc | y |
| 253 | 52654-87-4 | Fe amm sulfate/urea | 0.1M/0.5M | 300 ± 5 | 4–6 Kpsi | 900 cc | y |
| 255 | 52654-88-1 | Fe(NO3)3/urea | .1M/0.5M | 300 ± 17 | 4.2–5.8 Kpsi | 4 gal | y |
| 257 | 52654-89-1 | Fe(NO3)3/NH4OH | 0.1M/30% | room temp | atm | 1 liter | y |
| 259 | 52654-89-2 | Fe(NO3)3/urea | .1M/0.5M | boiling on hot plate | atm | 700 cc | y |
| 261 | 52654-90-1 | Fe(NO3)3/urea | .1M/0.5M | 300 ± ? | 4.0–6.4 kpsi | 4 liters? | y |
| 263 | 52654-90-2 | Fe(NO3)3/Na2SO4 | .1M/0.05M | 100–100° C. | 3.4–5.6 kpsi | 1 liter | y |
| 265 | 52654-90-3 | Fe(NO3)3/Na2SO4 | .1M/0.05M | 125–130° C. | 3.6–5.6 kpsi | 1 liter | y |
| 267 | 52654-90-4 | Fe(NO3)3/Na2SO4 | .1M/0.05M | 150–155° C. | 3.6–5.6 kpsi | 1 liter | y |
| 269 | 52654-91-1 | Fe(NO3)3/Na2SO4 | .1M/0.05M | 135–140° C. | 3.8–5.6 kpsi | 1 liter | y |
| 271 | 52654-91-2 | Fe amm sulfate/urea | 0.1M/0.5M | 300 ± 10° C. | 4–6 Kpsi | 1 liter | y |
| 273 | 52654-91-3 | Fe amm sulfate/urea | 0.1M/0.5M | 275 ± 5° C. | 3.2–5.4 Kpsi | 400 cc | y |
| 275 | 52654-91-4 | Fe(NO3)3/Na2SO4 | 0.5M/0.25M | 105 ± 2° C. | 4.2–5.8 Kpsi | 2 liter | y |
| 276 | 52654-92-1 | Fe(NO3)3/Na2SO4 | 0.5M/0.25M | 125–130° C. | 4.2–5.8 Kpsi | 2 liter | y |
| 278 | 52654-92-2 | Fe amm sulfate | 0.1M | 107 ± 2° C. | 4.2–5.6 Kpsi | 1 liter | y |
| 280 | 52654-92-3 | Fe amm sulfate | 0.1M | 125–130° C. | | 1 liter | y |
| 282 | 52654-92-4 | Fe(NO3)3/Na2SO4/NaOH | 0.5M/0.25M/?? | not heated | | 1 liter? | y |
| 284 | 52654-92-5 | Fe(NO3)3/Na2SO4/NaOH | 0.5M/0.125M/?? | 107 ± 2° C. | 4.2–5.8 kpsi | 1 liter | y |
| 286 | 52654-93-1 | Fe amm sulfate | 0.1M | 175 ± 5° C. | 4.2–5.8 Kpsi | 1 liter | y |
| 289 | 52654-93-2 | Fe(NO3)3/urea | .1M/0.25M | 300 ± 10° C. | 4.0–5.6 kpsi | 4 liters | y |
| 291 | 52654-93-3 | Fe(NO3)3/urea | .1M/0.375M | 300 ± 10° C. | 4.0–5.6 kpsi | 4 liters | y |
| 293 | 52654-93-4 | Fe amm sulfate | 0.1M | 200 ± 5° C. | 4.0–5.4 Kpsi | 1 liter | y |
| 295 | 52654-93-5 | Fe amm sulfate | 0.1M | 250 ± 5° C. | 4.0–5.4 Kpsi | 1 liter | y |

TABLE 7-continued

Laboratory Data

| | A | B | C | D | E | F | G |
|---|---|---|---|---|---|---|---|
| 1 | Sample Number | Precursor | Concentration | Temperature | Pressure | Amount | Powder |
| 297 | 52654-94-1 | Fe(NO3)3/urea | .1M/0.5M | 300 ± 5° C. | 4.4–5.6 kpsi | 2 liters | y |
| 298 | | | | | | | |
| 299 | | | | | | | |
| 300 | | | | | | | |
| 301 | | | | | | | |
| 302 | | | | | | | |
| 303 | | | | | | | |
| 304 | | | | | | | |
| 305 | | | | | | | |
| 306 | | | | | | | |
| 307 | | | | | | | |
| 308 | | | | | | | |
| 309 | | | | | | | |
| 310 | | | | | | | | zirconia. Based upon initial precursor concentrations, cerium loading was about 16 mole % of cerium. Cerium loading may range from 0% to 100%.

Further, in Table 7, samples 54548-69-1 to 54548-69-4 were made by co-processing of $Fe(NO_3)_3$ with $H_3PO_4$. The XRD analysis of the yellow powder product showed the product to be crystallites of iron phosphate.

EXAMPLE 8

An experiment was conducted to produce a biomass conversion catalyst, nickel on zirconia, using the present invention then to test the activity of the biomass conversion catalyst. Preparations are given in Table 8. All samples produced biomass conversion powder.

None of the samples were as active as commercially available nickel on zirconia catalyst.

EXAMPLE 9

Figure 4A:
FIG. 4a is a 500× micrograph of an alloy made by the method of the present invention.
Figure 4B:

In Table 7, samples 54548-66-1 and 54548-67-3 resulted in an alloy precursor powder containing about equal molar amounts of nickel and chromium. The alloy precursor powder was placed in an atmosphere of argon with 4% hydrogen (reducing atmosphere) then heated to a temperature of 1400° C. for 2 hr to reduce the powder into an alloy. FIG. 4a shows a 500× magnification of the microstructure of the alloy. The dark islands 42 are predominantly chromium metal (about 98 mole % chromium, balance nickel), and the light areas 44 are nickel chromium alloy. FIG. 4b is a 5000× magnification of the alloy. FIG. 4a was compared to a photomicrograph, FIG. 5.16, page 111, Introduction to High Temperature Oxidation of Metals, M. Birks and G. H. Meier, 1983. The comparison showed that the chromium metal islands 42 of the alloy of FIGS. 4a and 4b were much smaller (by about 50%) compared to those of Birks and Meier, and were more interconnected than those of Birks and Meier.

TABLE 8

RTDS-II Experimental Parameters

| Run # | Precursor Solution | Temperature (°C.) | Pressure (psi) | Residence Time (sec.) | Volume (l) |
|---|---|---|---|---|---|
| RTDS 2 | 0.1M Iron Nitrate | 340–350 | 7,500 | 6 | 4 |
| RTDS 3 | 0.1M Iron Nitrate | 200 | 7,500 | 6 | 4 |
| RTDS 7–9 | 0.1M Nickel Nitrate + Urea | 305 | 6,000 | 4 | 5 |
| RTDS 10 | Supernate from RTDS 7 and 8 | 325 | 5,000 | 4 | 4 |
| Coal Catalyst Series | 0.1M Iron Nitrate | 300–350 | 5,000 | 4 | 8 |
| Coal Catalyst Series | 0.1M Iron Nitrate | 300–325 | 4,000 | 10 | 32 |
| Nickel Catalyst Series I | 0.1M Nickel Nitrate + 0.5M Urea | 300–325 | 4,000 | 12 | 4 |
| Nickel Catalyst Series I | 0.1M Nickel Nitrate + 0.5M Urea | 300 | 4,000 | 8 | 12 |
| RTDS 13 | 0.1M Titanium Phosphate Oxylate | 230 | 6,000 | 8 | 6 |
| Nickel Catalyst Series II | 0.1M Nickel Nitrate + 0.5M Urea | 300 | 5,000 | 30 | 6 |
| Oak Ridge Series | 0.1M Zirconyl Nitrate | 325–350 | 6,500 | 30 | 4 |
| Oak Ridge Series | 0.1M Zirconyl Nitrate | 300 | 6,000 | 15–23 | 300 |
| Nickel Catalyst Series III | 0.025M Zirconyl Nitrate + 0.025M Nickel Nitrate + 0.125M Urea | 300 | 5,800 | 20 | 8 |
| Nickel Catalyst Series III | 0.025M Zirconyl Nitrate + 0.0325M Nickel Nitrate + 0.1875M Urea | 300 | 5,800 | 20 | 6 |

TABLE 8-continued

RTDS-II Experimental Parameters

| Run # | Precursor Solution | Temperature (°C.) | Pressure (psi) | Residence Time (sec.) | Volume (l) |
|---|---|---|---|---|---|
| Nickel Catalyst Series III | 0.01M Zirconyl Nitrate + 0.09M Nickel Nitrate + 0.4M Urea | 300 | 5,000 | 15–20 | 8 |
| Yttrium Stabilized Zirconium Series | 0.092M Zirconyl Nitrate + 0.008M Yttrium Nitrate | 200–300 | 4–5,000 | 11,30 | 50 |
| Yttrium Stabilized Zirconium Series | 0.046M Zirconyl Nitrate + 0.004M Yttrium Nitrate | 280 | 5,000 | 30 | 10 |
| Yttrium Stabilized Zirconium Series | 0.184M Zirconyl Nitrate + 0.016M Yttrium Nitrate | 280 | 5,000 | 30 | 35 |
| Yttrium Stabilized Zirconium Series | 0.276M Zirconyl Nitrate + 0.024M Yttrium Nitrate | 280 | 4,800 | 30 | 18 |
| Yttrium Stabilized Zirconium Series | 0.368M Zirconyl Nitrate + 0.032M Yttrium Nitrate | 280 | 5,000 | 30 | 1 |
| Yttrium Stabilized Zirconium Series | 0.046M Zirconyl Nitrate + 0.004M Yttrium Nitrate + 0.5M Urea | 300 | 5,000 | 30 | 70 |
| Nickel Catalyst Series IV | 0.06M Nickel Nitrate + 0.04M Zirconyl Nitrate + 0.25M Urea | 280–370 | 4,200 | 20–30 | 30 |
| Nickel Catalyst Series IV | 0.03M Nickel Nitrate + 0.07M Zirconyl Nitrate + 0.25M Urea | 270–300 | 3,000 | 20 | 28 |

Figure 5A:
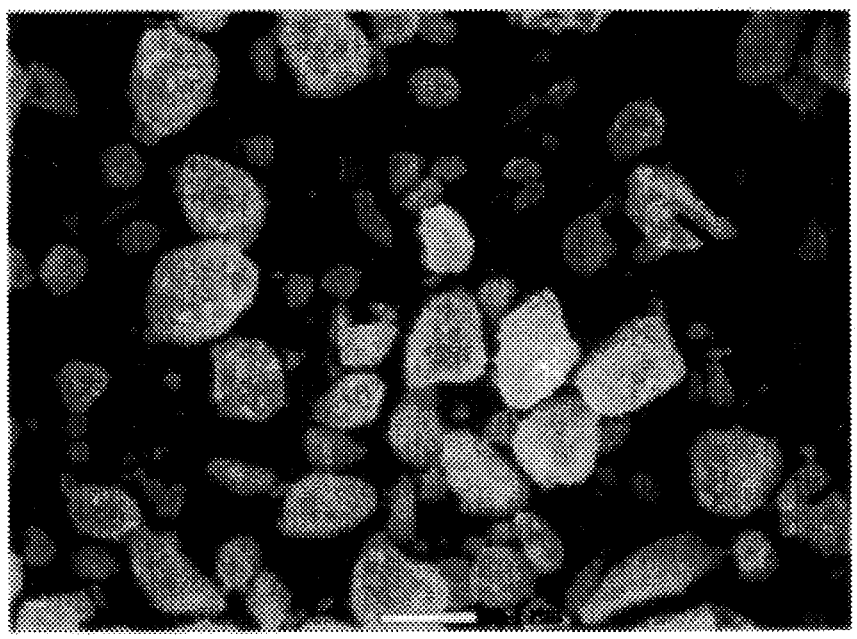
FIG. 5a is a 250× micrograph of particles made by the method of the present invention.

Several alloys of nickel and zirconia were made in accordance with the present invention as shown in Table 9. Powder particles 51 are shown in FIG. 5a. In addition to requiring less specific energy for formation, the particles are more uniform in size and shape than those obtained by mechanical milling or mixing.

Figure 5B:
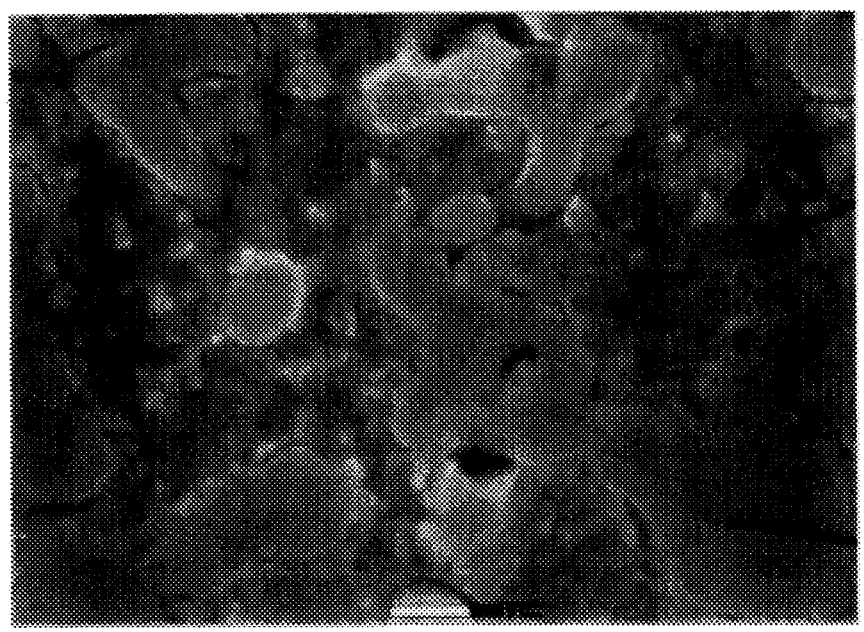

The particles 51 were first pressed into pellets, then placed in an atmosphere of argon with 4% hydrogen (reducing) and heated to a temperature of 1375° C. for 2 hr. FIG. 5b shows a 10,000× magnification of the densified alloy wherein the islands 52 are zirconia-rich nickel zirconia alloy, and the regions 54 are nickel-rich zirconia nickel alloy.

A sample processed at 1200° C. produced a uniform nickel zirconia alloy with no detectable phase separation.

TABLE 9

Nickel Zirconia Alloy Preparations

| Sample | ZrO(NO$_3$)$_2$ (M) | Ni(NO$_3$)$_2$ (M) | Urea (M) | Residence Time (sec.) | Volume (l) | Temp. (°C.) |
|---|---|---|---|---|---|---|
| NiZr1 | 0.025 | 0.025 | 0.125 | 25 | 6.0 | 295–300 |
| NiZr2 | 0.025 | 0.038 | 0.188 | 25 | 3.6 | 295–300 |
| NiZr2A | 0.04 | 0.06 | 0.3 | 25 | 4.0 | 295–300 |
| NiZr3 | 0.01 | 0.09 | 0.2 | 25 | 3.0 | 295–300 |
| NiZr3A | 0.01 | 0.09 | 0.4 | 25 | 4.0 | 285–310 |
| NiZr4 | 0.05 | 0.05 | 0.0 | 15–20 | 4.0 | 290–300 |

Table 9 Notes:
1. NiZr4 was green suspension which did not separate. All other samples flocculated.
2. XRD of NiZr1 showed about 50/50 mix of NiO and ZrO$_2$. ZrO$_2$ was less than 10 nm and NiO was 35 nm.
3. XRD of NiZr4 (15 sec.) was similar to samples made with 25 sec. residence time.

EXAMPLE 10

An experiment was conducted to compare the catalytic activity of a palladium on zirconia catalyst made according to the method of the present invention and a similar commercially available catalyst. Samples 54548-114-1 and 54548-115-1 in Table 7 resulted in palladium on zirconia catalyst material having 1 mole % palladium. The commercially available 1 mole % palladium on zirconia catalyst, tradename Ecospheres, was obtained from E. Heller and Company, Austin, Tex.

Both catalysts were subjected to identical reaction conditions. Five mL of an aqueous solution containing 0.0195M Na$_2$-EDTA and the solid catalyst were irradiated with UV light for 8 hr while air was bubbled through the solution. The percent consumption is the difference between percent EDTA destroyed with air minus the percent destoyed under identical conditons without the air purge.

Results are shown in Table 10.

TABLE 10

EDTA Destruction Activity of 1% Palladium on Titania Catalysts

| Catalyst | Weight of Catalyst | Percent Consumption |
|---|---|---|
| Ecospheres | 1.6 g | 20% |
| 54548-115-1 | 0.2 g | 47% |

The specific percent consumption of the Ecospheres was 12.5% per gram, whereas the specific percent consumption of the 115-1 was a surprising 235% per gram. In other words, assuming a linear relationship to obtain equal percent consumption, the amount of necessary catalyst prepared according to the present invention is an unexpected 18.8 times less than the necessary amount of commercially available catalyst.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of making nanometer-sized particles, comprising the steps of:
   (a) making a solution of a soluble precursor in a solvent wherein substantially no particles are formed or precipitated as a result of making said solution, and flowing said solution through a reaction vessel in a continuous manner;
   (b) pressurizing and heating said flowing solution in said reaction vessel, said heating initiating chemical reactions thereby nucleating and forming substantially insoluble solid particles, while maintaining said flowing solution in a substantially liquid phase; and
   (c) quenching said heated flowing solution and arresting growth of said solid particles.

2. The method as recited in claim 1, wherein said solvent is inorganic.

3. The method as recited in claim 1, wherein said solvent is water.

4. The method as recited in claim 3, wherein said precursor is a water-soluble compound.

5. The method as recited in claim 1, wherein said solvent is ammonia.

6. The method as recited in claim 1, wherein said solvent is an organic fluid.

7. The method as recited in claim 1, wherein initial particles are added to the solution prior to heating and the solution is maintained in a substantially liquid phase.

8. The method as recited in claim 1, wherein said solid particles are selected from the group consisting of metals, metal oxides, intermetallics, metal sulfides, metal hydroxides, emtal oxyhydroxides, and any mixture thereof.

9. The method as recited in claim 1, wherein said chemical reaction is an interaction of said precursor with said solvent.

10. The method as recited in claim 9, wherein said precursor is a metal salt hydrolyzed to a metal hydroxide.

11. A method as recited in claim 9, wherein said precursor is a metal salt oxidized to a metal oxide.

12. A method as recited in claim 1, wherein said chemical reaction is thermal breakdown of said precursor.

13. A method as recited in claim 1, wherein an additional solute is added to said solution.

14. A method as recited in claim 13, wherein said chemical reaction is thermal decomposition of said additional solute.

15. The method as recited in claim 13, wherein said solution contains a sulfate and sulfation occurs prior to crystalite formation.

16. The method as recited in claim 13, wherein said additional solute contains a metal.

17. The method as recited in claim 13, wherein said additional solute contains sulfate to form a combined precursor solution wherein sulfation occurs prior to crystalite formation and said solid particles are sulfated metal oxide.

18. The method as recited in claim 13, wherein said solution contains a soluble zirconium containing salt and said additional solute contains sulfate to form acombined precursor solution wherein sulfation occurs prior to crystallite formation and said solid particles are sulfated zirconia.

19. The method as recited in claim 1, wherein said solution contains a metal sulfate.

20. A method as recited in claim 1, wherein said particles have absolute sizes from 1 nm to 150 nm with size distribution ranges varying from 8 to 50 nm.

21. The method as recited in claim 1, wherein about 80% of the soluble precursor is converted to the particles in a single pass through the vessel in a time less than about minutes.

22. A method of making nanometer-sized particles, comprising the steps of:
   (a) making a solution of a soluble precursor in a liquid solvent, and flowing said solution through a reaction vessel in a continuous manner;
   (b) pressurizing and heating said flowing solution in said reaction vessel/while maintaining a substantially liquid phase, said heating initiating chemical reactions and nucleating and forming substantially insoluble solid particles; and
   (c) quenching said heated flowing solution and arresting growth of said solid particles.

23. The method as recited in claim 22, further comprising the step of adding a second precursor.

24. The method as recited in claim 23, wherein said soluble precursor is $K_2TiO(C_2O_4)_2$ and said second precursor is $PdCl_2$ and said solid particle(s) is a palladium-titania catalyst.

25. The method as recited in claim 23, wherein said soluble precursor is $Fe(NO_3)_3$, and said second precursor is urea and said solid particle(s) is suspended ferric oxyhydroxide.

26. The method as recited in claim 25, further comprising precipitating the suspended ferric oxyhydroxide with $H_3PO_4$ wherein said solid particle(s) is a pink solid.

27. The method as recited in claim 23, wherein said soluble precursor is $Fe(NO_3)_3$, and said second precursor is $H_3PO_4$ wherein said solid particle(s) is iron phosphate.

28. The method as recited in claim 23, wherein said soluble precursor is zirconyl nitrate and said second precursor is cerium nitrate wherein said solid particle(s) is a cerium-zirconia catalyst.

29. The method as recited in claim 22, wherein about 80% of the soluble precursor is converted to the particles in a single pass through the vessel in a time less than about 5 minutes.

30. A method of making nanometer-sized particles, comprising the steps of:
   (a) making a solution of a soluble precursor in a solvent of supercritical carbon dioxide, and flowing said solution through a reaction vessel in a continuous manner;
   (b) pressurizing and heating said flowing solution in said reaction vessel, said heating initiating chemical reactions and nucleating and forming substantially insoluble solid particles; and
   (c) quenching said heated flowing solution and arresting growth of said solid particles.

31. A method of making nanometer-sized particles, comprising the steps of:
   (a) making a solution of a soluble precursor in a solvent, said precursor a metal yielding metal carbonyl, and flowing said solution through a reaction vessel in a continuous manner;
   (b) pressurizing and heating said flowing solution in said reaction vessel, said heating initiating thermal breakdown of said precursor and nucleating and forming substantially insoluble solid particles; and
   (c) quenching said heated flowing solution and arresting growth of said solid particles.

32. A method of making nanometer-sized particles, comprising the steps of:
   (a) making a solution of a soluble precursor in a solvent wherein the solvent is substantially a liquid, and flowing said solution through a reaction vessel in a continuous manner;
   (b) pressurizing and heating said flowing solution and in said reaction vessel, maintaining said solution substantially in the liquid phase, said heating initiating chemical reactions thereby nucleating and forming substantially insoluble solid particles; and
   (c) quenching said heated flowing solution and arresting growth of said solid particles.

33. The method as recited in claim 32, wherein said solvent is water.

34. The method as recited in claim 32, wherein said precursor is a water-soluble compound.

35. The method as recited in claim 32, wherein about 80% of the soluble precursor is converted to the particles in a single pass through the vessel in a time less than about 5 minutes.

* * * * *

UNITED STATES PATENT AND TRADEMARK OFFICE
CERTIFICATE OF CORRECTION

PATENT NO. : 5,652,192
DATED : 07/29/97
INVENTOR(S) : Matson et al.

It is certified that error appears in the above-indentified patent and that said Letters Patent is hereby corrected as shown below:

In column 6, line 1, please replace "uponthe" with --upon the--.

In column 37, table 8, 5th vol. entry, please replace number "18" with number --16--.

Signed and Sealed this

Twenty-eighth Day of October, 1997

Attest:

BRUCE LEHMAN

Attesting Officer

Commissioner of Patents and Trademarks